United States Patent [19]

Baker, Jr. et al.

[11] Patent Number: 4,942,602

[45] Date of Patent: * Jul. 17, 1990

[54] COORDINATED TRANSFER OF VOICE AND INFORMATION THROUGH A NETWORK OF DIGITAL SWITCHES

[75] Inventors: William T. Baker, Jr., Palo Alto; Charles M. Buffum, San Jose; Charles H. Jolissaint, Sunnyvale; Gregg W. Kerlin, Los Gatos, all of Calif.

[73] Assignee: International Business Machines Corporation, Armonk, N.Y.

[*] Notice: The portion of the term of this patent subsequent to Feb. 21, 2006 has been disclaimed.

[21] Appl. No.: 294,524

[22] Filed: Jan. 6, 1989

[51] Int. Cl.⁵ .................. H04M 3/58; H04M 7/14
[52] U.S. Cl. ........................ 379/212; 379/96; 379/203; 379/225; 370/62
[58] Field of Search ............. 379/94, 96, 212, 211, 379/214, 225, 203, 207; 370/62

[56] References Cited

U.S. PATENT DOCUMENTS

| | | | |
|---|---|---|---|
| 4,313,036 | 1/1982 | Jabara et al. | 379/207 |
| 4,488,004 | 12/1984 | Bogart et al. | 379/225 |
| 4,653,045 | 3/1987 | Stanley et al. | 370/62 |
| 4,656,624 | 4/1987 | Collins et al. | 370/60 |
| 4,805,209 | 2/1989 | Baker, Jr. et al. | 379/96 |

Primary Examiner—Thomas W. Brown
Attorney, Agent, or Firm—Keith Stephens

[57] ABSTRACT

In many business applications, data about a client is created and entered on an agent's data terminal during a teleconference with the client. Often, it is necessary to transfer the client to a specialist during the course of the conversation. This invention describes a method of transferring the call and the data terminal information associated with the call to any available phone extension with an associated data terminal. A plurality of Computerized Branch Exchanges (CBX) are joined via a network means to facilitate the transfer of the call and pass a host program the phone source extension and the destination extension for the transfer. The host program looks up the source and destination extensions in a phone to terminal file and determines the network address of the data terminals involved and transfers the appropriate host application terminal display to invoke a transfer of display information. The host application sends the data terminal information to the destination data terminal display in conjunction with the transferred phone call.

26 Claims, 18 Drawing Sheets

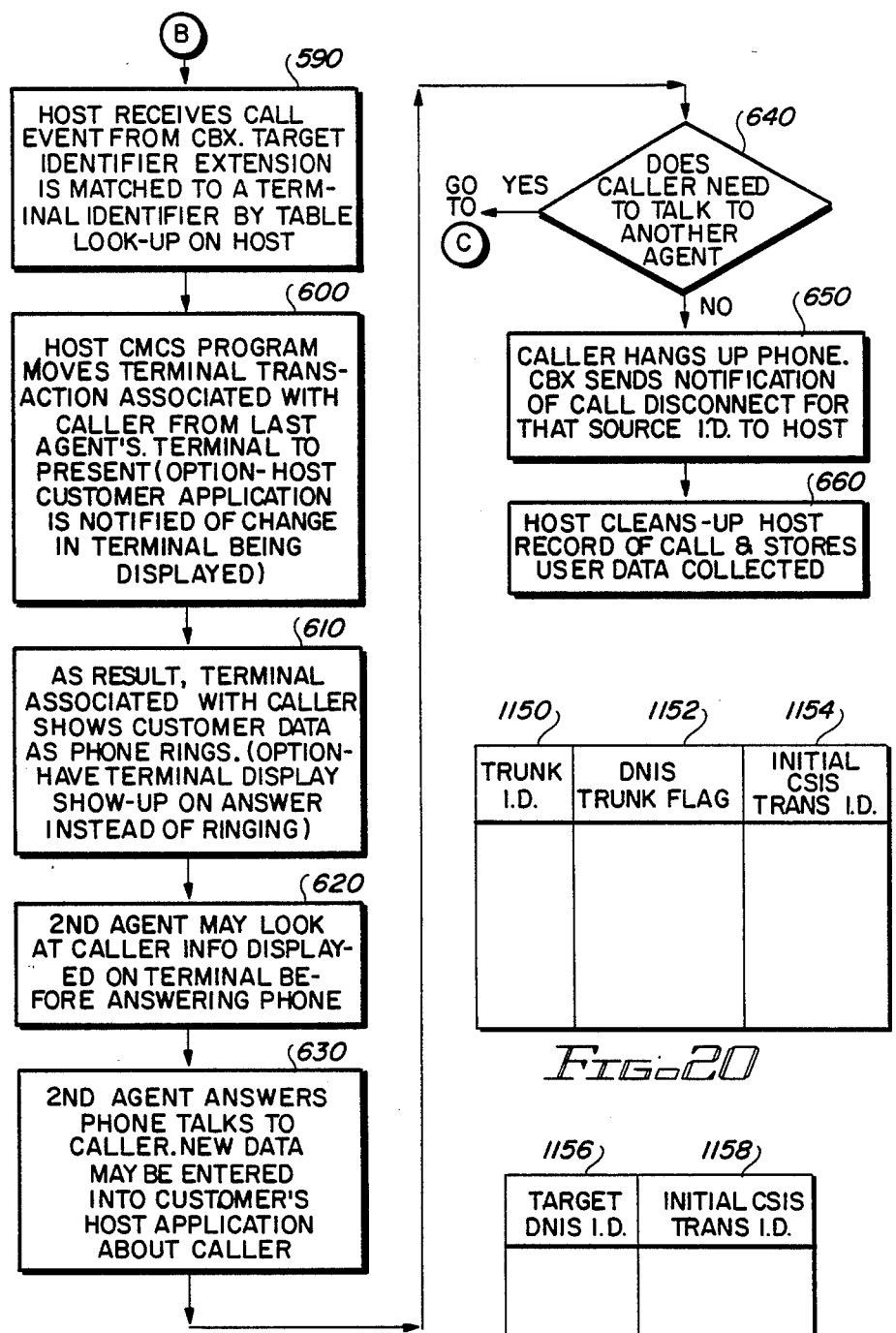

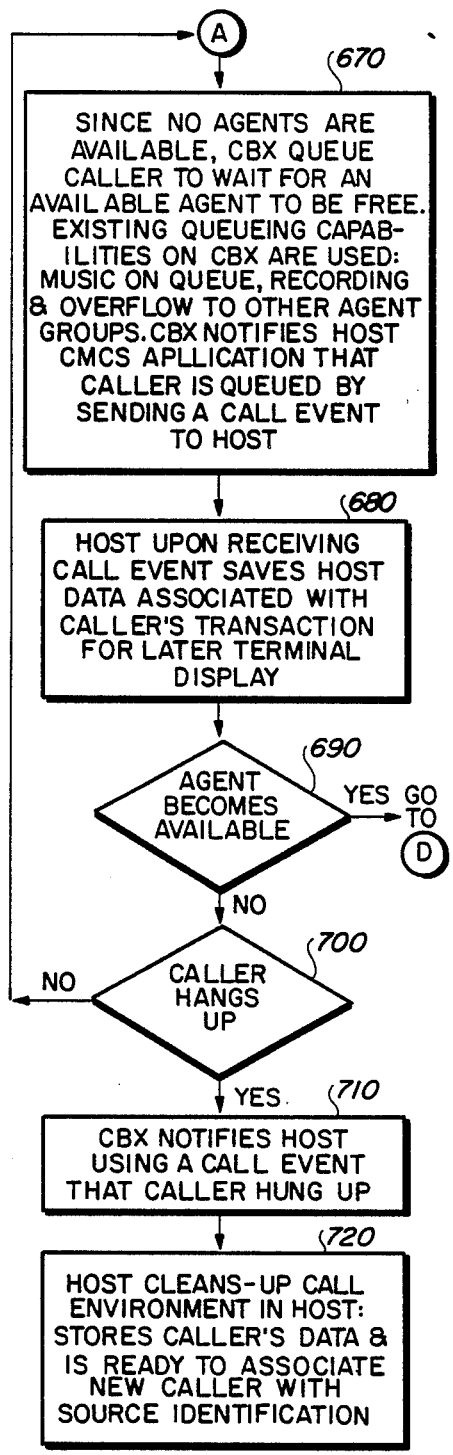

| VALUE | FUNCTION |
|---|---|
| 0 | EVENT |
| 1 | EVENT-STREAM |
| 2 | FILE |
| 3 | SESSION |
| 4 | STATUS |
| 5-255 | RESERVED |

| VALUE | SUBFUNCTION |
|---|---|
| 0 | ABORT |
| 1 | ACCOUNT-CODE |
| 2 | ALERT |
| 3 | CALL-ABANDON |
| 4 | CALL-ASSIGN |
| 5 | CALL-CONNECT |
| 6 | CALL-DIRECT |
| 7 | CALL-PICK |
| 8 | CALL-QUEUE |
| 9 | CALL-REDIRECT |
| 10 | CALL-TRANSFER |
| 11 | CBX-NOTIFICATION |
| 12 | CONFIG-UPDATE |
| 13 | EMERGENCY |
| 14 | END-HALF-HOUR |
| 15 | INITIAL-STATUS |
| 16 | LOG-OFF |
| 17 | LOG-ON |
| 18 | OFF |
| 19 | ON |
| 20 | PARTY-ADD |
| 21 | PARTY-DROP |
| 22 | PARTY-HOLD |
| 23 | PARTY-RECONNECT |
| 24 | QUEUE-STATUS |
| 25 | RECORDING |
| 26 | SEND |
| 27 | SET-DATE-TIME |
| 28 | STATUS |
| 29 | JACK-IN |
| 30 | JACK-OUT |
| 31-255 | RESERVED |

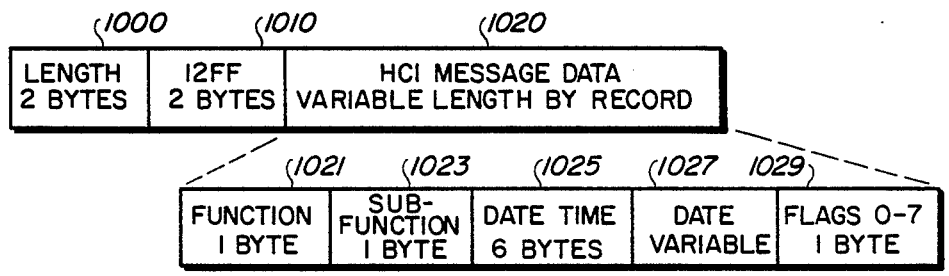

FIG-10

| VALUE | FUNCTION | VALUE | SUBFUNCTION |
|---|---|---|---|
| 4 | STATUS | 2 | ALERT |
| 0 | EVENT | 1 | ACCOUNT-CODE |
|   |   | 3 | CALL-ABANDON |
|   |   | 4 | CALL-ASSIGN |
|   |   | 5 | CALL-CONNECT |
|   |   | 6 | CALL-DIRECT |
|   |   | 7 | CALL-PICK |
|   |   | 8 | CALL-QUEUE |
|   |   | 9 | CALL-REDIRECT |
|   |   | 10 | CALL-TRANSFER |
|   |   | 11 | CBX-NOTIFICATION |
|   |   | 12 | CONFIG-UPDATE |
|   |   | 13 | EMERGENCY |
|   |   | 14 | END-HALF-HOUR |
|   |   | 15 | INITIAL-STATUS |
|   |   | 16 | LOG-OFF |
|   |   | 17 | LOG-ON |
|   |   | 20 | PARTY-ADD |
|   |   | 21 | PARTY-DROP |
|   |   | 22 | PARTY-HOLD |
|   |   | 23 | PARTY-RECONNECT |
|   |   | 24 | QUEUE-STATUS |
|   |   | 25 | RECORDING |
|   |   | 27 | SET-DATE-TIME |
|   |   | 28 | STATUS |
|   |   | 29 | JACK-IN |
|   |   | 30 | JACK-OUT |
| 1 | EVENT-STREAM | 18 | OFF |
|   |   | 19 | ON |
| 2 | FILE | 0 | ABORT |
|   |   | 26 | SEND |
| 3 | SESSION | 16 | LOG-OFF |
|   |   | 17 | LOG-ON |

FIG-12

| DATA / TIME FIELD |   |   |
|---|---|---|
| YMDhms Y – LAST TWO DIGITS OF YEAR, M – MONTH, D – DAY, h – HOUR, m – MINUTES, s – SECONDS (ALL VALUES ARE BINARY) | | |
| FLAG | FLAG # | MEANING |
| REQUEST | 0 | "REQUEST" MESSAGE |
| RESPONSE-START | 1 | FIRST "RESPONSE" MESSAGE |
| RESPONSE-END | 2 | LAST "RESPONSE" MESSAGE |
| RESPONSE-CONTINUED | 3 | "RESPONSE", BUT NOT FIRST OR LAST |
|  | 4-7 | RESERVED |

FIG. 13

| FIRST-PARTY 9 BYTE PARTY FIELD | SECOND-PARTY OPTIONAL PARTY FIELD |
|---|---|
| PARTY FIELD: PARTY-TYPE : 1 BYTE PARTY-NUMBER : 7 BYTES OF ASCII CHARACTERS PARTY-FLAGS : 1 BYTE | |
| VALUE | PARTY-TYPE |
| 0 | EXTENSION |
| 1 | TRUNK |
| 2 | PILOT |
| 3 | RECORDING |
| 4 | ATTENDANT |
| 5-255 | RESERVED |
| BIT # | PARTY-FLAG |
| 0 | NON-ACD-AGNT(0) OR ACD-AGNT(1) |
| 1 | INCOMING |
| 2 | OUTGOING |
| 3-7 | RESERVED |
| OPTIONAL PARTY FIELD OPT-CT : 1 BYTE PARTY : 9 BYTES OPTIONAL COUNT FIELD: OPT-CT | |

FIG. 14

| FIRST-PARTY 9 BYTE PARTY FIELD | SECOND-PARTY 9 BYTE PARTY FIELD | THIRD-PARTY OPTIONAL PARTY FIELD |
|---|---|---|

PARTY FIELD:
    PARTY-TYPE    :1 BYTE
    PARTY-NUMBER :7 BYTE OF ASCII CHARACTERS
    PARTY-FLAGS   :1 BYTE

| VALUE | PARTY-TYPE |
|---|---|
| 0 | EXTENSION |
| 1 | TRUNK |
| 2 | PILOT |
| 3 | RECORDING |
| 4 | ATTENDANT |
| 5-255 | RESERVED |

| BIT # | PARTY-FLAGS |
|---|---|
| 0 | NON-ACD-AGNT(0) OR ACD-AGNT(1) |
| 1 | INCOMING |
| 2 | OUTGOING |
| 3-7 | RESERVED |

OPTIONAL PARTY FIELD:
    OPT-CT  :1 BYTE
    PARTY   :9 BYTES
OPTIONAL COUNT FIELD:
    OPT-CT

*FIG. 15*

| FIRST-PARTY 9 BYTE PARTY FIELD | SECOND-PARTY 9 BYTE PARTY FIELD |
|---|---|

PARTY FIELD:
    PARTY-TYPE    :1 BYTE
    PARTY-NUMBER :7 BYTES OF ASCII CHARACTERS
    PARTY-FLAGS   :1 BYTE

| VALUE | PARTY-TYPE |
|---|---|
| 0 | EXTENSION |
| 1 | TRUNK |
| 2 | PILOT |
| 3 | RECORDING |
| 4 | ATTENDANT |
| 5-255 | RESERVED |

| BIT # | PARTY-FLAGS |
|---|---|
| 0 | NON-ACD-AGNT(0) OR ACD-AGNT(1) |
| 1 | INCOMING |
| 2 | OUTGOING |
| 3-7 | RESERVED |

*FIG. 16*

| FIRST-PARTY 9 BYTE PARTY FIELD | SECOND-PARTY 9 BYTE PARTY FIELD | DNIS' OPTIONAL DNIS FIELD |
|---|---|---|
| PARTY FIELD:     PARTY-TYPE :1 BYTE     PARTY-NUMBER :7 BYTES OF ASCII CHARACTERS     PARTY-FLAGS :1 BYTE | | |
| VALUE | PARTY-TYPE | |
| 0<br>1<br>2<br>3<br>4<br>5-255 | EXTENSION<br>TRUNK<br>PILOT<br>RECORDING<br>ATTENDANT<br>RESERVED | |
| BIT # | PARTY-FLAGS | |
| 0<br>1<br>2<br>3-7 | NON-ACD-AGNT(0) OR ACD-AGNT(1)<br>INCOMING<br>OUTGOING<br>RESERVED | |
| DNIS FIELD:     DNIS-CT     DNIS-NUM | | |

FIG. 17

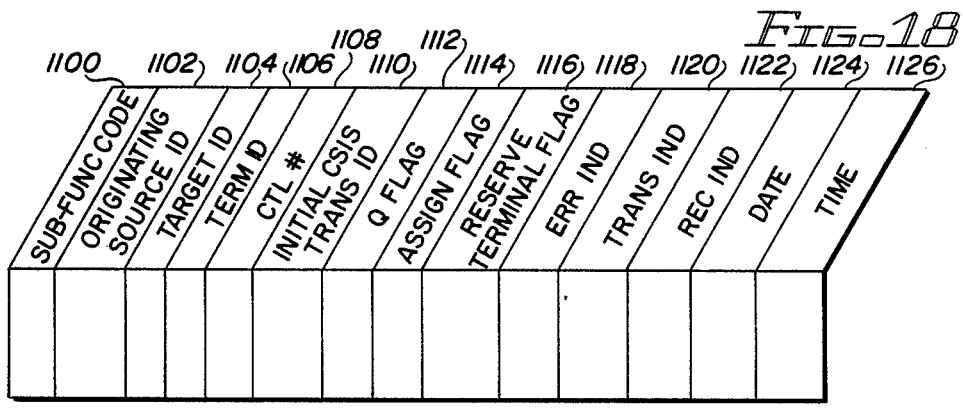

FIG. 18

| EXTENSION ID (1130) | TERMINAL ID (1132) | RESERVE TERM FLAG (1134) | INITIAL CSIS TRANS ID (1136) | TRANSFER NOTIFY INDICATOR (1138) | RECOVERY NOTIFY INDICATOR (1140) |
|---|---|---|---|---|---|
|  |  |  |  |  |  |

FIG. 19

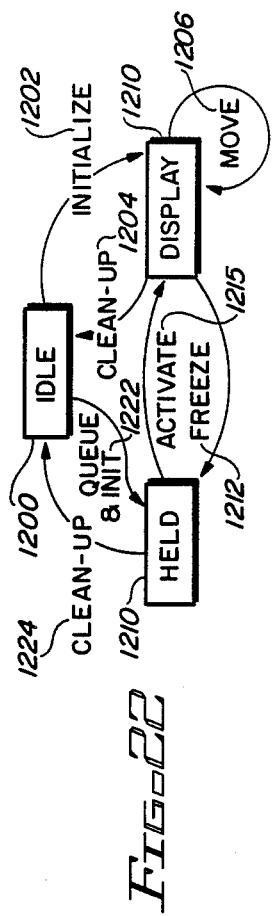

```
1  MM/DD/YY                 EXTENSION TO TERMINAL CORRELATION TABLE
2
3
4  PLEASE ENTER EXTENSION ID: _____ OR TERMINAL ID: _____ TO SEARCH FOR.
5  SELECT ONE OF THE FOLLOWING OPTIONS:
6
7     1  ADD
8     2  DELETE
9     3  CHANGE
10    4  VIEW
11 TYPE YOUR SELECTION AND PRESS THE ENTER KEY.                SELECTION => ____
12
13                                       RES                    TRANSFER    RECOVERY
14 SEQ    EXTENSION          TERMINAL    TER  APPLICATION        NOTIFY      NOTIFY
15 NUM       ID                 ID       FLG  INIT TRAN ID      INDICATE    INDICATE
16 XXX  ###############  #####   X       #####         #####       #####
17 XXX  ###############  #####   X       #####         #####       #####
18 XXX  ###############  #####   X       #####         #####       #####
19 XXX  ###############  #####   X       #####         #####       #####
20 XXX  ###############  #####   X       #####         #####       #####
21 ERROR/PROMPT MESSAGES
22 PRESS PFI FOR HELP, OR CLEAR KEY TO QUIT.
23 PFI=HELP  PF2=   PF3=   PF4=   PF5=   PF6=   PF7=BKWRD
24 PF8=FRWD  PF9=   PF10=  PFII=  PF12=     PAI=    PA2=
```

FIG. 26

```
1   MM/DD/YY
2
3                     TRUNK ID TO APPLICATION CORRELATION TABLE
4
5  PLEASE ENTER TRUNK ID:_____ TO SEARCH FOR.
6  SELECT ONE OF THE FOLLOWING OPTIONS:
7     1    ADD
8     2    DELETE
9     3    CHANGE
10    4    VIEW
11 TYPE YOUR SELECTION AND PRESS THE ENTER KEY. SELECTION=>____
12
13                                  APPLICATION
14 SEQ         TRUNK        DNIS      INIT
15 NUM          ID          FLAG     TRAN ID
16 XXX      # #### #####     #       # # # #
17 XXX      # #### #####     #       # # # #
18 XXX      # #### #####     #       # # # #
19 XXX      # #### #####     #       # # # #
20 XXX      # #### #####     #       # # # #
21 ERROR/PROMPT MESSAGES
22 PRESS PF1 FOR HELP, OR CLEAR KEY TO QUIT.
23 PF1= HELP  PF2=    PF3=   PF4=   PF5=   PF6=   PF7= BKWRD
24 PF8= FRWD  PF9=   PF10=   PF11=  PF12= PA1=   PA2=
```

FIG. 27

```
1   MM/DD/YY
2
3                     DNIS TRUNK APPLICATION CORRELATION TABLE
4
5  PLEASE ENTER TARGET DNIS ID:_____
6  SELECT ONE OF THE FOLLOWING OPTIONS:
7     1    ADD
8     2    DELETE
9     3    CHANGE
10    4    VIEW
11 TYPE YOUR SELECTION AND PRESS THE ENTER KEY. SELECTION=>____
12
13              TARGET          APPLICATION
14 SEQ           DNIS              INIT
15 NUM            ID              TRAN ID
16 XXX       # # # # # # # # #    # # # #
17 XXX       # # # # # # # # #    # # # #
18 XXX       # # # # # # # # #    # # # #
19 XXX       # # # # # # # # #    # # # #
20 XXX       # # # # # # # # #    # # # #
21 ERROR/PROMPT MESSAGES
22 PRESS PF1 FOR HELP, OR CLEAR KEY TO QUIT.
23 PF1=HELP  PF2=   PF3=   PF4=  PF5=  PF6=   PF7=BKWRD
24 PF8=FRWD  PF9=   PF10=  PF11= PF12=  PA1=   PA2=
```

FIG. 28

```
1  MM/DD/YY
2
3              AGENT EXTENSION TO TERMINAL CORRELATION
4
5  PLEASE ENTER YOUR EXTENSION NUMBER_____ AND PRESS ENTER.
6
7
8  THE FOLLOWING IS THE INFORMATION CURRENTLY ASSOCIATED WITH
9  THIS EXTENSION NUMBER:
10
11    EXTENSION NUMBER: ########  CBX ID: XXX
12
13    TERMINAL ID: ####          LU ID: XXXX
14
15 INITIAL CICS TRANSACTION ID: ####
16 TRANSFER NOTIFICATION INDICATOR: ##
17 RECOVERY NOTIFICATION INDICATOR: ##
18
19 PLEAS TYPE OVER FIELDS YOU WANT TO CHANGE AND PRESS ENTER TO
20 PROCESS CHANGES.
21 ERROR/ PROMPT MESSAGES
22 PRESS PF1 FOR HELP, OR CLEAR KEY TO QUIT.
23 PF1= HELP PF2=  PF3=  PF4=  PF5=  PF6=  PF7= BKWRD
24 PF8= FRWD PF9=  PF10=  PF11=  PF12=  PA1=  PA2=
```

FIG. 29

COORDINATED TRANSFER OF VOICE AND INFORMATION THROUGH A NETWORK OF DIGITAL SWITCHES

FIELD OF THE INVENTION

This invention generally relates to improvements in data processing applications in a multiplex communication system and, more particularly, to the use of a digital switch and host application to control the transfer of a phone call and the terminal display information associated with the phone call to another phone and terminal pair on another digital switch.

DESCRIPTION OF THE PRIOR ART

The past several years have seen the exploitation of digital switch capabilities, particularly the ability to multiplex voice and data through the switch.

Traditionally, phone systems were used to manage voice communication. Functions such as connecting, transferring and forwarding phone calls became normal features expected in a phone system. The office environment was incomplete without a phone occupying one corner of an employee's desk. The phone became the umbilical cord linking the employee to their clients.

Later, computers arrived on the business scene. Applications such as accounts receivable, accounts payable and inventory control mandated the use of a display terminal to communicate information to the computer applications. Soon, the typical office environment included a display terminal to complement the phone for communicating information to the computer.

Then, as computer applications became more sophisticated and creative, the customer service department recognized the value of the display terminal as a tool and married the telephone with the display terminal to respond to customer requirements. Soon, customer service personnel became accustomed to responding to customer inquiries via a telephone as they entered information into a computer application via a display terminal and exchanged the display terminal information with the customer.

The display terminal also provided a useful repository of information for the employee. For example, a client could call to obtain a current quotation on a stock portfolio. The client might also request prospectus information on other possible investments. The employee could access a host database to acquire the stock information; and, if the client wanted to place an order for additional stock, the employee could transfer the call to a broker. However, the broker would have to access the same information again that the other employee had before him on the display terminal before transferring the call.

While the phone and the display terminal provided a wealth of information, the coordination of the phone and display terminal has not been handled effectively in the prior art. An example of a prior art approach to the problem of transferring phone calls is found in U.S. Pat. No. 4,694,483, to Cheung, issued Sept. 15, 1987. The Cheung system provides a telephone call routing system for routing incoming telephone calls to a plurality of agent display modules. The agent display modules have a list of all phone calls that are waiting to be handled by the particular agent. Each of the agent display modules are monitored to balance the calls to each of the displays. However, there is no display information containing customer information coordinated with any of the calls. Therefore, this prior art approach does not provide the unique functionality that the subject invention provides.

Another prior art approach to data call transfers is found in U.S. Pat. Nos. 4,535,199 and 4,532,377 to Zink, issued Aug. 13, 1985 and July 30, 1985. The Zink system provides for the redirection of established phone calls to remotely located digital terminals. The system allows the transfer of a voice telephone call to a digital terminal to accommodate the transfer of digital information in response to pressing a DATA button on the phone. The system is employed to accommodate the use of a single phone for transferring data and voice. There is no teaching of display terminal use for the display of data in conjunction with the transfer of a phone call across a network of digital switches.

Another slightly different approach specifically designed for telemarketing applications is illustrated in U.S. Pat. No. 4,788,682 to Vij et al. The Vij patent discloses a method for providing a directory number to a sales person engaged in telemarketing to increase the efficiency of outbound telemarketing personnel. This patent provides no teaching of transferring information associated with a call to another interested party in conjunction with the transfer of the call. Also, there is no teaching of transfer of information over a network.

This invention is an improvement on U.S. Pat. No. 4,805,209 to the same inventors. Features have been added to the original invention to manage the access of information associated with a telephone call through a network. We are unaware of any similar capability.

SUMMARY OF THE INVENTION

It is therefore an object of this invention to provide a method of effecting and coordinating the transfer of telephone calls and separate host based information related to a call through a plurality of digital switches under the management of a host processor.

It is a further object of the invention to provide the option of displaying information associated with a caller on a display terminal attached to one of the host processors or the digital switches before the call is answered by a transferee responder.

It is another object of the invention to accommodate existing host applications for displaying the information across the network of digital switches.

It is yet another object of the invention to collect status information on all aspects of the transfer as it transpires.

It is still another object of the invention to use a protocol to simplify communication between the host and the digital switch.

According to the invention, these objects are accomplished by configuring a set of host data structures to link phone extensions to particular display terminals attached to the host and a particular Customer Information Control System application. The data structures also contain information regarding the appropriate transfer of information from the host application to the phone extension across the network of digital switches.

Computerized Branch Exchange (CBX) and host have communication managers to facilitate the transfer of messages using a standard protocol. Also, a standard application manager is used to coordinate the activities of the system programs and other preexisting applications. The status of each call is carefully tracked by the system programs and recorded in logs for later analysis.

BRIEF DESCRIPTION OF THE DRAWINGS

The foregoing and other objects, aspects and advantages of the invention will be better understood from the following detailed description of the preferred embodiment of the invention with reference to the accompanying drawings, in which:

FIG. 8 is a continuation of a flowchart of the logic of the Call Management Control System in accordance with the present invention;

FIG. 9 is a further continuation of a flowchart of the logic of the Call Management Control System in accordance with the present invention;

FIG. 10 is a block diagram of the layout of a General Data Stream which is the communication medium in accordance with the present invention;

FIG. 11 is a list of the function and subfunction codes and their meanings in accordance with the present invention;

FIG. 12 is a list of the proper groupings of subfunctions and functions in accordance with the present invention;

FIG. 13 is a list of proper format of the data and time fields and the one byte flag field of the communication transaction in accordance with the present invention;

FIG. 14 is a block diagram and field layout of the CALL ABANDONED transaction in accordance with the present invention;

FIG. 15 is a block diagram and field layout of the CALL TRANSFER transaction in accordance with the present invention;

FIG. 16 is a block diagram and field layout of the CALL CONNECT transaction in accordance with the present invention;

FIG. 17 is a block diagram and field layout of the CALL GROUP transaction in accordance with the present invention;

FIG. 18 is an illustration of the Call Management Control Table in accordance with the present invention;

FIG. 19 is an illustration of the Extension to Terminal Table in accordance with the present invention;

FIG. 20 is an illustration of the Trunk to Application Table in accordance with the present invention;

FIG. 21 is an illustration of the Dialed Number Indirect Service to Application Table in accordance with the present invention;

FIG. 22 is a state diagram of the call processing in accordance with the present invention;

FIG. 25 is a screen illustration of the View Call Management Control Tracking Table configuration display in accordance with the present invention;

FIG. 26 is a screen illustration of the Extension to Terminal Correlation Table configuration display in accordance with the present invention;

FIG. 27 is a screen illustration of the Trunk ID To Application Correlation Table configuration display in accordance with the present invention;

FIG. 28 is a screen illustration of the Dialed Number Indirect Service Trunk Application Correlation configuration display in accordance with the present invention;

FIG. 29 is a screen illustration of the Agent Extension To Terminal Correlation configuration display in accordance with the present invention;

DESCRIPTION OF THE PREFERRED EMBODIMENT OF THE INVENTION

System Overview

Traditional business telecommunication applications have separate voice and data components. These business applications can be enhanced by integrating the voice and data components as described herein.

Figure 1:
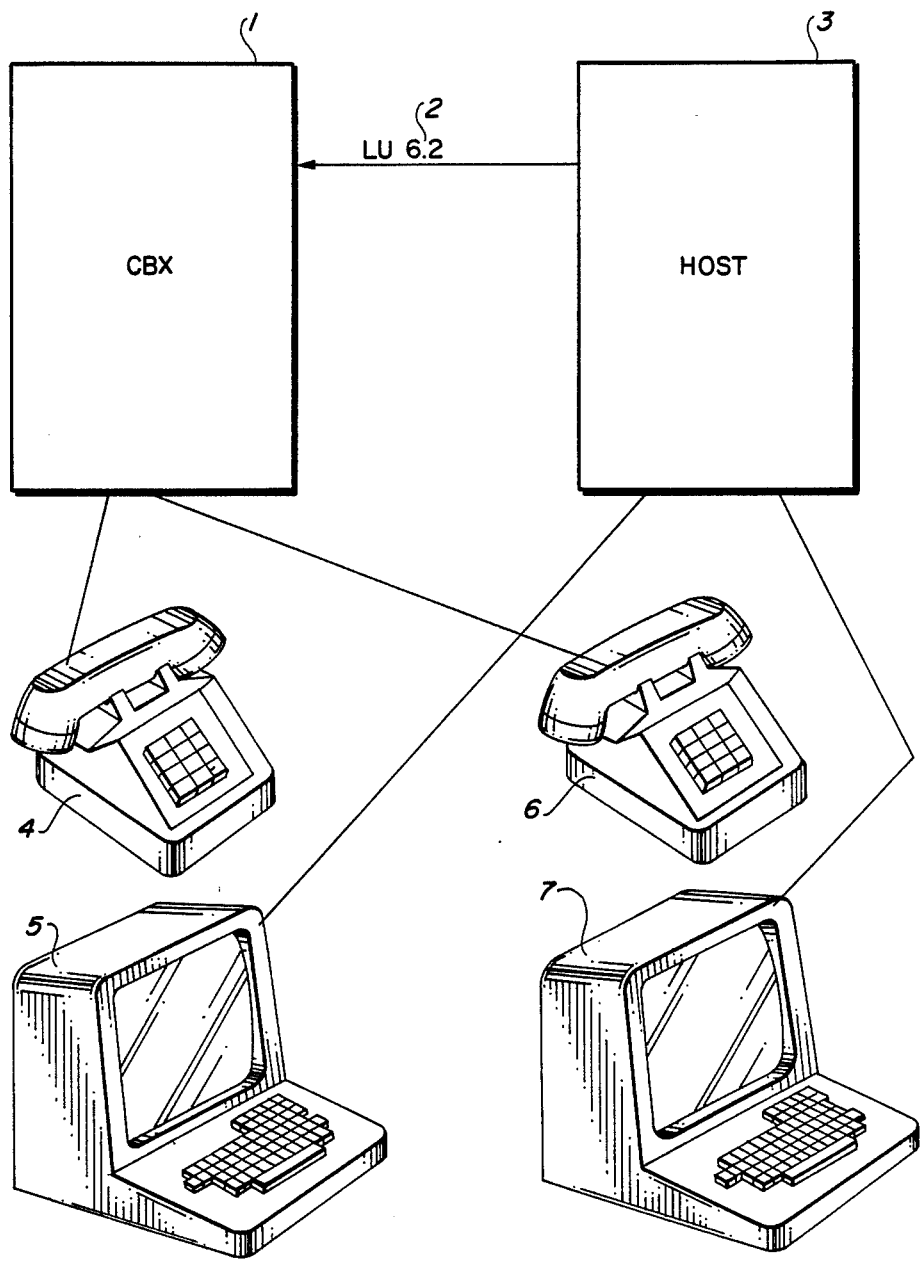
FIG. 1 is an illustration of the major functional parts of a Call Management Control System (CMCS) in accordance with the present invention.

Referring now to the figures, and more particularly to FIG. 1, there is an example of the major functional parts of the Call Management Control System (CMCS). The Computerized Branch Exchange (CBX) 1 is the digital switch that manages the telephone processing. The CBX 1 interfaces to the host 3 via an Logical Unit (LU) 6.2 interface 2. Using the example discussed above, to transfer the phone call from extension 4 to extension 6, the agent performs the normal tasks associated with transferring a call. The CBX 1 translates the request into a corresponding host display terminal transfer request transaction from terminal display 5 to display terminal 7. The transaction is built and sent from the CBX 1 through the LU 6.2 link 2 to the host 3. The host 3 performs a table lookup to determine the terminal display 7 associated with the new phone extension 6. Then, the current display transaction that is displayed on the transferror terminal display 5 is displayed on the new terminal display 7. A more detailed analysis of the processing is disclosed below.

Hardware Environment

Background On The Computerized Branch Exchange (CBX)

Figure 2:
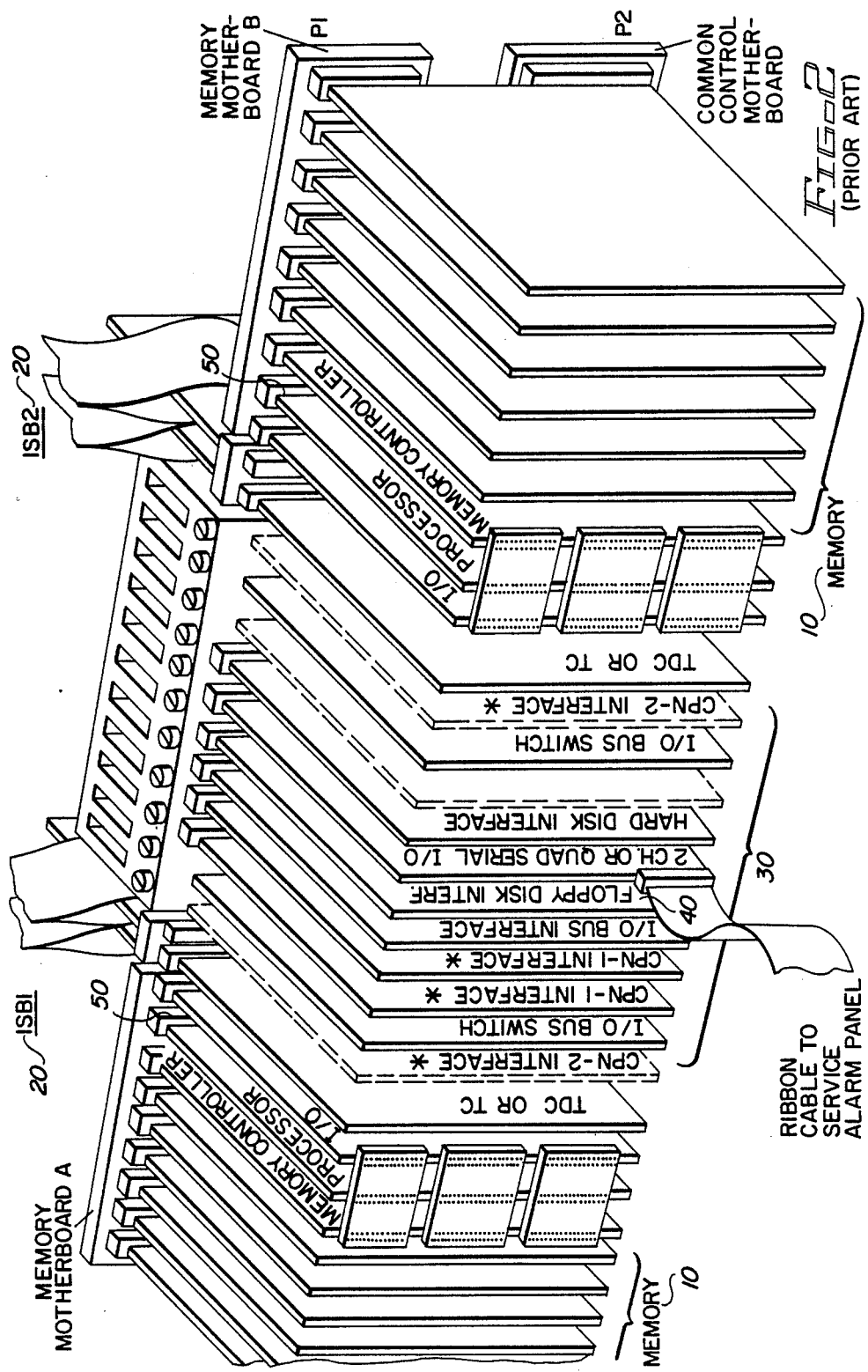
FIG. 2 is a system drawing of a prior art Computerized Branch Exchange (CBX) similar to the CBX employed in the present invention.

An example of a prior art CBX, similar to the preferred embodiment, is provided in FIG. 2, which illustrates the computer control equipment associated with the prior art ROLM CBX II 9000. The hardware consists of redundant memory 10, a shared, switched I/O bus (ISB) 20, various interface cards 30, disk 40, and redundant processors 50. A remote node attachment is also provided via the Inter Node Link (INL). A more complete discussion of the hardware environment is provided in the *ROLM CBX II 9000 Business Communications System*, published by ROLM Corporation (1986).

Figure 3:
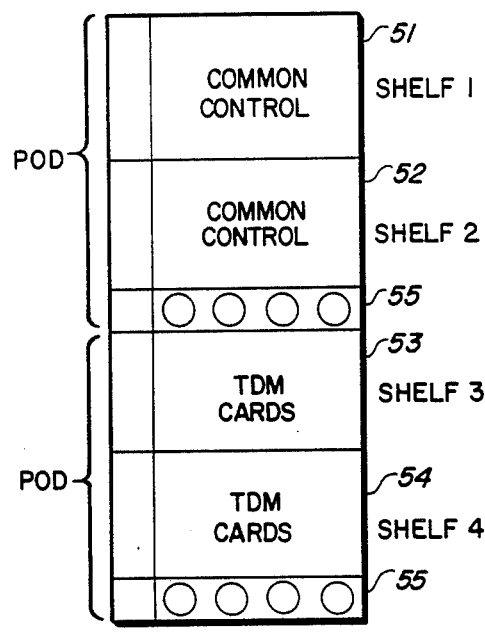
FIG. 3 is an illustration of the hardware shelf layout of the Central Branch Exchange in accordance with the present invention.

CBX hardware for practicing the subject invention is shown in FIGS. 3, 4, 5, and 6. FIG. 3 illustrates the hardware shelf layout of the CBX. Shelf one 51 is a common control shelf in a redundant system cabinet or another Time Division Multiplex (TDM) card shelf in a nonredundant system cabinet. Shelf two 52 is always a common control shelf. Shelves three 53 and four 54 are always TDM card shelves. Air cooling systems and redundant power systems are provided at 55 to dissipate heat and provide system power.

Figure 4:
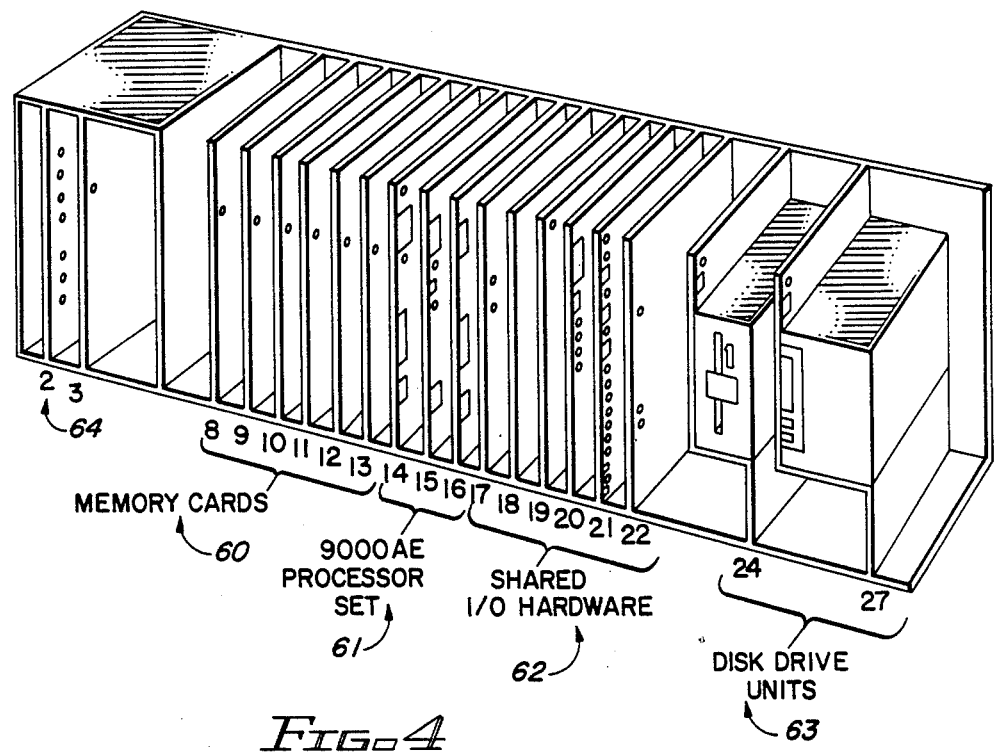
FIG. 4 is an illustration of the Central Branch Exchange Central Processing Unit shelf slots in accordance with the present invention.

FIG. 4 illustrates the CPU shelf slots of the common control slot 52. As shown, there are memory cards 60, processor set 61, shared input/ output (I/O) hardware 62, and disk drive units 63. The processor cards contain the microprocessors. Additionally, there is a common control motherboard 64 that joins the memory cards 60, the processor set 61 and the shared I/O hardware 62 to the system bus. The common control motherboard 64 is used to join the other common control motherboard from the redundant common control shelf 51 and the TDM shelves 53 and 54.

Figure 5:
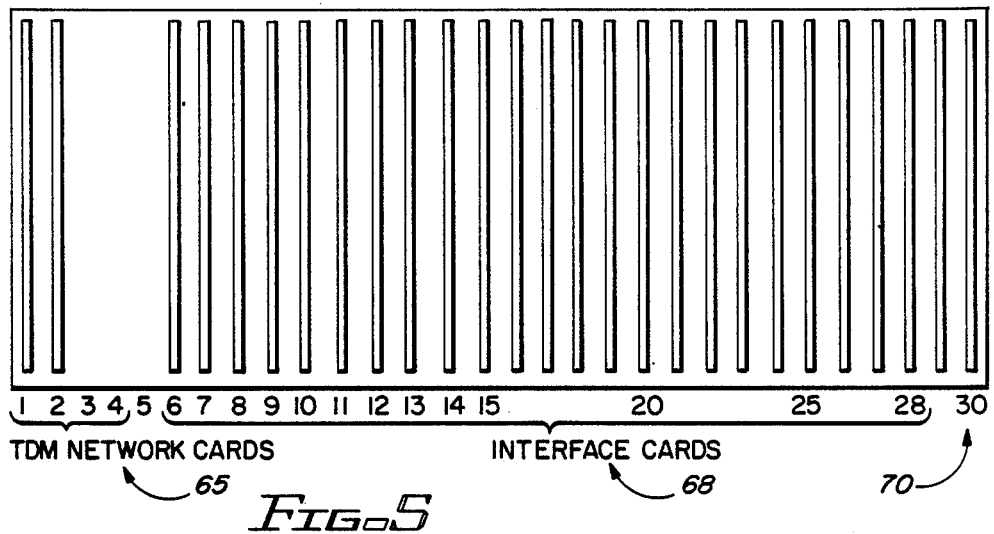
FIG. 5 is an illustration of the Central Branch Exchange Time Division Multiplex shelf slots in accordance with the present invention.

FIG. 5 shows the TDM shelf slots. The TDM communication cards fit into the slots shown at 65. The other TDM cards occupy the slots at 68. Slot 70 is reserved for Line Shelf Monitor LSM which monitors the power supply and contains the fuses. If LSM detects a power supply failures or fuse failures, it is reported to error analysis by a scanner reporting a monitor error. Error analysis then parses specific decision trees to generate suggested actions.

CBX Hardware Description

Figure 6:
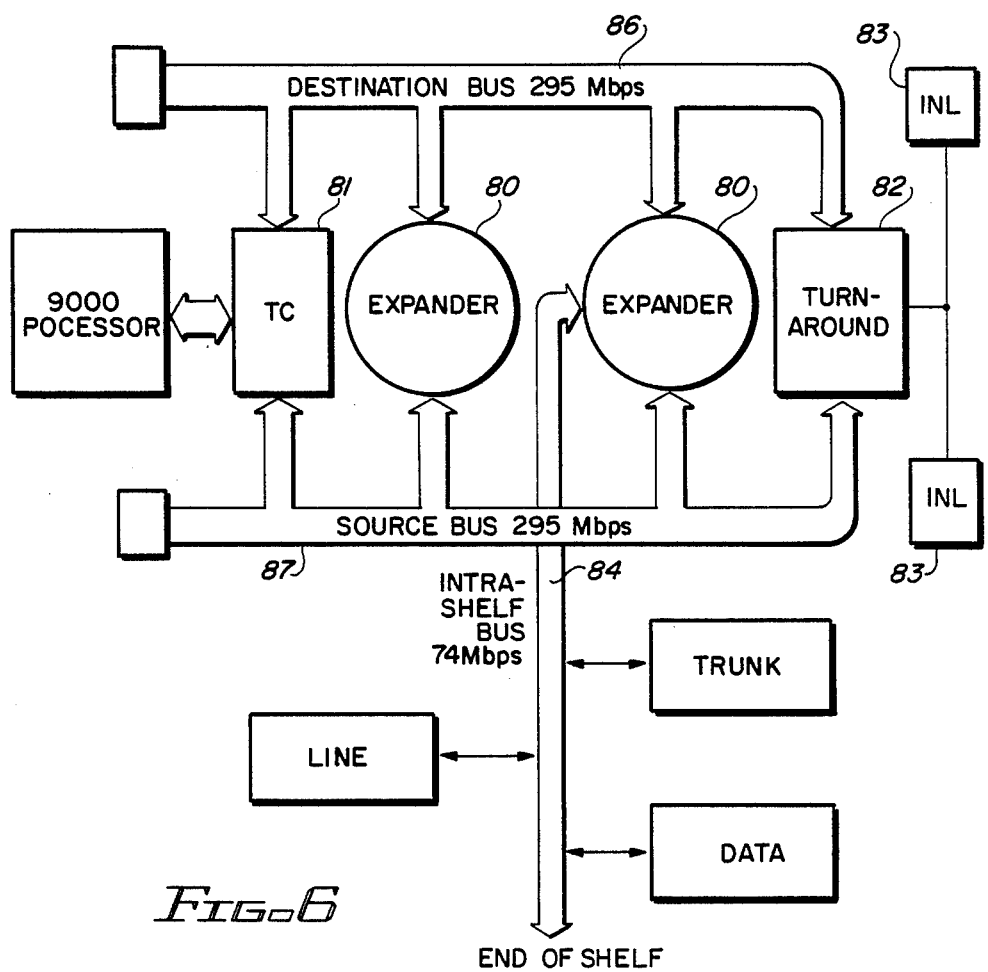
FIG. 6 is an illustration of the Central Branch Exchange hardware block diagram in accordance with the present invention.

The following hardware description discusses FIG. 6, which is a hardware block diagram of the CBX system. The figure is a functional representation of the preferred embodiment of the CBX.

SINGLE-NODE COMMUNICATION

Nodes are the modular building blocks of the CBX system. Each node can function as a stand-alone telecommunication system consisting of the time division multiplexing (TDM) switching network, processors, cabinet and power system, and interface cards. A single-node system can expand from one to five equipment cabinets to accommodate up to 2,000 lines.

The CBX is a digital switching system using TDM and pulse code modulation (PCM) to support a wide range, of voice, data, and specialty applications. A 32-bit processor and Random Access Memory (RAM) provide control intelligence within each node.

Time Division Multiplexing

Multiplexing is a method of using a single communication channel to carry multiple speech and/or data transmissions simultaneously. The TDM channel use is alternated between users or between system functions, each receiving a small portion of channel time (a time slot) in rotation. The channel seems to be reserved for each individual transmission, but because of the high-speed channel, it carries many transmissions simultaneously.

Pulse Code Modulation

When the first CBX was shipped in 1975, ROLM was the first vendor in the industry to use PCM technology. PCM is the process which analog sound waves of voice conversations are sampled, translated into digital signals, transported over the TDM network, and reconstructed into analog signals. The CBX samples voice signals at 8,000 times per second. The samples are converted into 8-bit binary words, which are transmitted over the data bus.

This chapter describes the four major components of a single-node communication system. They are presented in the following order:
TDM switching network
Computer common control
Cabinetry and power system
TDM interfaces to voice, data, trunk, and other resources

TDM SWITCHING NETWORK: BUS

Broadly defined, Bus is the entire TDM switching network. It maintains the connections established by the processor and passes information between the common control electronics and the telephones, terminals, and trunks. The bus is the vehicle for intranode communication.

The bus is a 16-bit, parallel, unidirectional bus that has a capacity of 295 megabits per second (Mbps). It provides 1,152 two-way or full-duplex communication channels, of which 1045 are available for voice/data traffic. The system uses the remaining channels for various control functions, such as setting up phone displays.

TDM Network

The major components of intranode communication are the TDM Network Control Group. This group consists of the:
Intrashelf Bus 84
Intershelf bus 86 & 87
Expander 80 cards
TDM controller cards

Intrashelf Bus 84

On the back of each TDM shelf is an Intrashelf Bus 84 implemented on the TDM backplane. The Intrashelf Bus 84 permits communication within a shelf. On each TDM shelf, one Expander 80 card plugs into each Intrashelf Bus 84. Expander 80 cards provide the interface between the Intrashelf Bus 84 and the intershelf bus (ISB).

The total bandwidth available on the Intrashelf Bus 84 is seventy-four Mbps. Each Intrashelf Bus 84 includes a 16-bit bidirectional data bus, a 10-bit address bus, and an "enable" line to each card. The enable line eliminates the need for configuring each card with a particular shelf address, so that interface cards can occupy any slot on the shelf. In addition, the enable line simplifies address decoding, which increases reliability

Intershelf Bus 85

ISB is an integral part of the proprietary Bus structure, handles communication among shelves through a flat, ribbon cable attached to the TDM controller (TC 81) card and the Expander 80 cards on each shelf.

The ISB supports a data rate of 295 Mbps over two unidirectional buses: the source bus 87 and the Destination bus 86.

Expander Cards

If a system has redundant processors, the Expander 80 cards are also redundant. When one common control side of the cabinet is active, one of the Expander 80 cards is in use, while the redundant (inactive) common control side and other Expander 80 card will wait to become active.

Each Expander 80 card contains a connection table for all voice and data connections affecting its shelf. This frees intrashelf bandwidth for call data, instead of consuming bandwidth for the address information needed to make connections.

The Expander 80 cards, TC 81 card, and Turnaround 82 card use the Bus ISB clock (located on the Turnaround 82 card) for timing the Bus traffic. This maintains the correct timing relationship between the data, which travels along the bus, and the clock pulses. The turnaround card also sends out a pulse at the beginning of each sampling interval. The pulse tells the Expander 80 card to start again with the first entry in the connection table.

TDM Controller Card

The Bus TC 81 card, maintains supervision of the processor-ISB-interface communication. TC 81 cards reside on the common control shelves in cabinet 1 of a CBX node. The TC 81 card is responsible for the following three activities: loading and verifying the connection table on each Expander 80; configuring the turnaround card and InterNode Link (INL 83) hardware; and communicating with the various line card groups. The TC 81 card handles up to 12 Mbps of control information.

The TC 81 card signals its activities by using a bus control field. Control packets contain addressing, control, and data information for loading the Expander 80 connection tables and reading the status of line cards.

The TC 81 cards maintain a communication path between the two ends of a voice or data call. The processor, through the TC 81 card, switches digitized signals by assigning them to unique time slots on the ISB. The Bus ISB uses TDM techniques, which enable the ISB to carry a large amount of simultaneous voice and data transmission.

TDM Controller Card

The Bus TC 81 card, maintains supervision of the processor ISB-interface communication. TC 81 cards reside on the common control shelves in cabinet 1 of a CBX node.

The TC 81 card is responsible for the following three activities: loading and verifying the connection table on each Expander 80; configuring the Turnaround 82 card and InterNode Link(INL 83) hardware; and communicating with the various line card groups. The TC 81 card handles up to 12 Mbps of control information.

The TC 81 card signals it activities by using a bus control field. Control packets contain addressing, control, and data information for loading the expander connection tables and reading the status of line cards.

The TC 81 card maintain a communication path between the two ends of a voice or data call. The processor, through the TC 81 card, switches digitized signals by assigning them to unique time slots on the ISB. The bus uses TDM techniques, which enable the ISB to carry a large amount of simultaneous voice and data transmission.

Turnaround Card

As its name implies, the Turnaround 82 card turns the data around on the bus. The Expander 80 card on the transmitting card's shelf places a data word on the source bus 87. The data word travels to the right until it encounters the Turnaround 82 card, which receives the word and retransmits it ("turns it around") to the Destination bus 86. Then the Expander 80 on the destination shelf captures the word and sends it on to the proper card.

The advantage of using the turnaround card is that information retransmitted in an individual time slot to the Destination bus 86 and the receiving card can be completely different from information received in that time slot from the source bus 87 and the transmitting card. This doubles the traffic capacity of the switch by allowing two internode conversations to take place in a single time slot on the bus.

To further understand how this occurs, imagine that a conversation is taking place on telephones with connections in node A. The system transmits a voice sample on the node-A source bus 87, and the sample encounters the Turnaround 82 card, which places this sample on the destination part of the same bus. The time slot on the destination part of the node-A bus has now become free.

The Turnaround 82 card can fill this empty slot with a voice sample from the other end of the conversation. In this way, the signals from both ends of the conversation can occupy the same time slot simultaneously.

System Clock

In each node of a multinode CBX system, the system clock provides timing for the TDM network via the Turnaround 82 card. It also synchronizes INL 83 operation between nodes. The source of this clock can be its own internal system, or it can synchronize from an external T1 interface trunk. The system clock conforms to Stratum 4 of the Bell Network Synchronization Plan.

Bus Capacity

The new Bus provides the CBX with 2,304 timeslots per node. Bandwidth is the measure of voice and data traffic capacity in the CBX. The clock speed of the Bus 16-bit parallels backplane is 18,432 MHz. The total bandwidth of the system is, therefore, 18,432 megahertz/second×16 bits/cycle=294.912 Mbps.

To restate this in terms of communication channels: since the CBX sampling frequency is 8 kHz, the bandwidth in each direction of a communication channel of the 16-bit backplane is 8,000 samples/second×16 bits/sample=128,000 bps (128 Kbps).

Note: Each sample is actually 8 bits; however, 16 bits are used to allow for future expansion of function. Therefore, the total bandwidth in a node with Bus is 1,152 channels×128 Kbps×2 connections/full-duplex channel=294,912 Mbps in each node.

Thus, the total bandwidth for a 15-node system with bus is 15 nodes×295 Mbps/node=4.425 Gbps (or 4,425,000,000 bps).

COMPUTER COMMON CONTROL

The CBX offers the advantage of computer common control. With the stored programs of computer common control, it is easy to update features as business needs change. This provides greater flexibility and reduces the cost of feature additions and other changes that may be made in the future.

The computer common control group directs all activities within the CBX system. A single-node CBX supports 1 or 2 common control shelves. Shelf 2 of cabinet 1 always houses a computer common control group. To increase reliability in critical applications or larger systems, shelf 1 can accommodate a second, or redundant, common control group. These groups consist of:

Processor
Memory
TDM control card
Floppy disk drives
A hard disk drive
Peripheral device controller
I/O cards
Diagnostic cards
Control Packet Network Interface (multinode only)

Processor

The 9000 is a 32-bit processor employed by the CBX. It is a ROLM-proprietary design using powerful, high-speed, bit-slice technology, with a ROLM proprietary instruction set. A single node configuration supports form 7,500 to 11,000 Busy Hour Call Attempts (BHCA); that is, the total number of call setups attempted during the hour when the CBX carries the most traffic. In a redundant system, the processor controlling the system is the active processor; the other one is the standby processor. Either processor can provide standby common control to prevent a failure in the active common control from halting system operation. The active processor continually transfers new information, such as moves and changes, Station Speed Calling information, as well as calls-in-progress information to the standby computer. Therefore, in the event of a switchover from the active computer, the standby computer always contains current information regarding the state of the system.

Every 24 hours, there is a systematic switchover from the active processor to the inactive processor (usually late at night) to ensure operational readiness of the standby processor. This redundancy results in virtually uninterruptable system operation.

Memory

CBX uses RAM to store all system software. Stored in memory are the system operating software, system-specific configuration parameters, and operating data. Each processor can access up to four memory cards. Each memory card accommodates 1 million words of memory, with each word composed of 16 bits plus 6 Error Correcting Code (ECC) bits. ECC improves the accuracy with which the system memory retains information. By automatically detecting and correcting all memory single-bit errors and detecting most multiple-bit errors, ECC minimizes the likelihood of a system failure due to a malfunctioning memory component.

Systems with redundant processors are capable of detecting multiple-bit errors and automatically switching to the redundant computer. In addition, a hardware register on the memory card enters errors into a table to aid servicing.

The major advantage of ECC is the elimination of "soft errors" that can generate numerous service calls. Soft errors are intermittent malfunctions, usually of short duration and low frequency, that might result from the execution of specific data patterns, the temperature of the room or static electricity. Soft errors can cause erratic system behavior, forcing service personnel to spend hours troubleshooting a fault that may not exist. The error detection and correction capability improves the reliability of the CBX system and eliminates needless hours of "trial and error" troubleshooting

Enhanced Communications Processor

The Enhanced Communications Processor (ECP) is a two-card processor that provides improved call setup, a foundation for future data products and applications. Supporting the ECP are the Data Front End (DFE) cards which reside on TDM shelves, and offloads the data call setup messages from the CBX processor. The DFE also allows call setup to occur at the baud rate of the calling device. This facilitates the use of popular PC-based communication packages that permit automatic data call setup.

DISK SYSTEMS

Peripherals housed on shelf 2 consist of two 3.5-inch, 1.44M floppy disks and one 5.25-inch, 40M hard disk, and a peripheral device controller (PDC) card. The right-hand end of the shelf contains the disk assemblies. IBM provides the CBX System Software, Release 9004.3, and diagnostic programs on floppy disks. The floppy disk system stores Initial Program Load (IPL) software, a back-up copy of the current site data base, and software updates (new software releases).

IPL is a "cold start" that loads information from a floppy disk into the system's main memory and is then written onto the 40M hard disk assembly. IBM technicians perform IPL at a customer's site when they install a system. The hard disk system contains disk storage media that are sealed form the environment to provide a high degree of reliability.

The hard disk contains the operating system program. It also has sufficient storage for certain voice and data applications to store information on a real-time basis. For example, the hard disk stores configuration tables, Moves, Adds, and Changes (MAC), and Forced Authorization Codes (FAC). Use of a hard disk provides faster access for configuration and move-and-change support that available from floppy disks.

Automatic Program Load (APL) software monitors the operating system program. After a power outage exceeding 20 minutes on ac systems (the maximum time the emergency battery will maintain memory until power is restored), APL reloads the system program automatically from the hard disk. Prior to that, memory is stored in RAM. APL for dc systems is necessary only if the system loses operational battery power (a rare occurrence).

DIAGNOSTIC CARDS

Diagnostic cards (the System Monitor Card [SMC] and Redundant Shelf Monitor [RSM] are housed on the common control shelves.

System Monitor Card (SMC)

SMC provides fuse/circuit alarm detection, software alarm detection, temperature alarm detection, power-failure detection, and dc voltage monitoring. This printed circuit card resides in one slot of the common control shelf (shelf 2) in both redundant and nonredundant configurations.

Power-failure indicator LED's located on the SMC, light when voltage drops. LED's also provide a high-temperature warning. Fuse-alarm circuitry generates both visual and audible alarms should a fuse malfunction.

Redundant Shelf Monitor

RSM provides redundant common control shelf status for SMC. One RSM resides on the redundant processor shelf (shelf 1) in Models 50 and 70.

Local Shelf Monitor

One Local Shelf Monitor (LSM) resides on each TDM or INL 83 shelf. LSM's monitor TDM shelf power and temperature status and notify the SMC of problems.

Service Maintenance Port

The SMP is a 4-channel maintenance interface that resides on common control shelf 2. Two of the four ports on the SMP are permanently assigned to the system terminal and the system modem.

The two available ports can support:
Automatic Call Distribution terminals
System administration data link
Call Detail Recording list device

Quad Serial I/O Port

Located on shelf 2 in the switched I/O bus, the Quad Serial I/O card is an optional card used to increase the number of devices a system can support. Each Quad Serial I/O card supports up to four devices used for features such as Expanded Traffic Reports, Automatic Call Distribution (ACD) statistics, moves, and changes. The Quad Serial I/O card supports the following RS-232-C ASCII devices, which run at data rates of up to 9.6 Kbps:
Modems
Printers or output-only devices
Loaders or input-only devices
"Smart" and "nonintelligent" terminals
Automatic Call Distribution terminals
Interface to the PhoneMail Application Processor

CABINETRY AND POWER SYSTEM

A node consists of one to five connected equipment cabinets. The maximum single-node configuration has 5 cabinets and a total of 20 shelves. When viewed from the front, cabinet 1 is on the left with shelves 1 to 4. Cabinet 2 is next with shelves 5 to 8, while cabinet 5 is on the far right with shelves 17 to 20.

Shelves contain three categories of equipment: computer common control; TDM interface cards for line, data, or trunk interface; and INL 83 for internode communication of voice and data information.

A more detailed discussion of the preferred mode of operation is provided in the ROLM System Service Manual, ROLM Corporation, October 1987.

CMCS Networking Specifics

The CBX is modified to accommodate the CMCS application as follows:

(1) Whenever a trunk or extension is ringing a phone with the CMCS monitor flag set on, a message is sent out of the host interface link. After encountering a CMCS flagged extension, the subsequent call events associated with the call continue to generate CMCS event transaction messages which are sent to the host. The message contains the trunk number (or extension) and the ringing extension number.

(2) Whenever an answering party (attendant or extension) transfers the trunk (or extension) to another extension, a message is generated. The message contains the trunk number and the ringing extension. The extension of the transferror is included when the transfer is screened (the transferror stays on and notifies the called extension of the call). If the transfer is not completed and the transferror retains the call, notification is sent that the call did not complete.

(3) If a trunk or extension is subsequently connected to another trunk, then a connection message is sent out of the host interface link. The message contains the originating source identification and the terminating trunk numbers.

(4) CBX system software connection messages are sent when ACD calls connect to phonemail for callback messaging or call redirection.

(5) Whenever a caller from a trunk or extension queues for an ACD group id/pilot number configured for CMCS, a connection message for the queue is sent out the host interface link. The message contains the originating trunk or extension and the ACD group id/pilot number.

(6) Finally, whenever a CMCS call is terminated, a message of termination is sent identifying the originating trunk or extension to the host.

Host Communication Link

The host link is a standard System Data Link Control (SDLC) communication link that conforms to the LU 6.2 standard. A detailed description of an LU 6.2 communication link and how to implement a program interface to conform with this standard is provided in the following publications by International Business Machines Corporation: Systems Network Architecture: Sessions Between Logical Units, GC20-1868; SNA Transaction Programmer's Reference Manual For LU Type 6.2, GC30-3084.

Host Hardware

The host hardware is one of the IBM System/370 processors. A detailed analysis of the IBM System/370 processor is provided in S/370 Reference Summary, GX20-1850, published by International Business Machines Corporation. While a S/370 host processor is described in the preferred embodiment, those skilled in the art will recognize that the invention can be practiced on other mainframes, minicomputers and microprocessors.

SOFTWARE ENVIRONMENT

CBX Software

There is a separate CMCS application that resides in the CBX software application memory. The application is invoked by the initiation of any call to a phone that is flagged in the CBX for CMCS event processing. The CBX software is responsible for processing information from each flagged extension, managing an SDLC communication link to the host, formatting LU 6.2 transactions and sending the formatted transactions via the SDLC card to the host processor.

Routing of a phone call is based on standard algorithms in the CBX for the originating call and the final destination of the call. Once the proper routing is determined, a host transaction is formatted and routed through the SDLC card to the host. The format of the various transactions are shown below in the message processing portion of the detailed invention. For more information on the detailed processing of calls, the reader is referred to the ROLM 9004.3 Business Communication System.

Host Software

Figure 23:
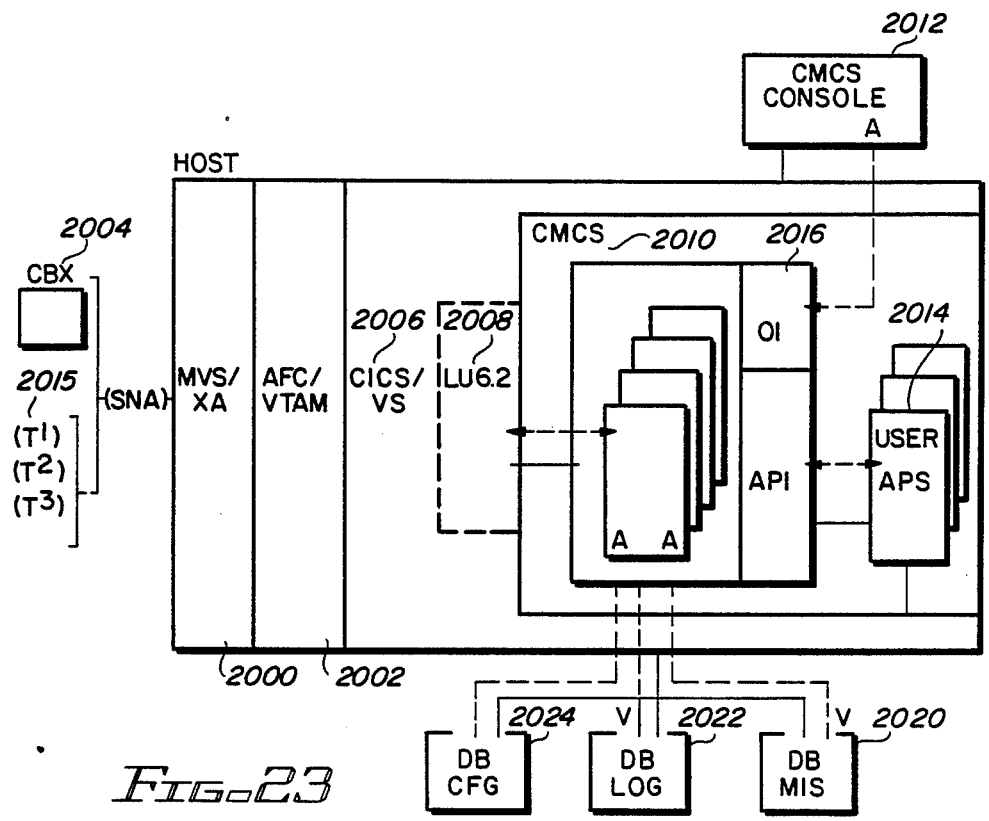
FIG. 23 is an overview block diagram of the Call Management Control System in accordance with the present invention.

A discussion of the host software is appropriate to understand the functions of CMCS. FIG. 23 provides a software overview of the CMCS system. The operating system, which manages the other host software and their use of system peripherals, is MVS/XA 2000. The host communication manager, ACF/VTAM 2002, interfaces with the operating system and manages the communication between the host and other peripherals such as the CBX 2004. CICS/VS 2006 manages the flow of information from application to display terminals.

The CMCS applications 2010 process the transactions from the CBX 2004 and coordinate the transfer of application 2014 information to the terminals 2015.

The CMCS 2010 and user 2014 applications are all CICS application programs. The interface to the user applications from CMCS 2010 is the Application Programming Interface (API) 2018.

Systems Operations manages the CMCS 2010 system through the operations interface (OI) 2016 and an attached CMCS console 2012. The CMCS console 2012 allows support personnel to track system operation and run queries against the three system files. The system tables and logs are: configuration 2024, log 2022 and management information services (MIS) 2020. The system tables are discussed in detail below.

Operating Systems

A variety of operating systems can be employed interchangeably for the host processor. The preferred operating system is Multiple Virtual Systems/Extended Architecture 2000 which is a multiple task, multiple user environment for execution on the newest of IBM's S/370 processors. The details of the operating system are described in MVS/XA OLTEP LOGIC, SY28-1188 and MVS/XA Logic VOLUMES 1-17, published by International Business Machines in July of 1986. There are two other operating system environments that the preferred embodiment may execute in. They are Virtual Machine/System Program and Virtual System Extended/System Program. These two operating systems are similar to MVS/XA and are described in VSE System IPO/Extended General Information Manual, GC20-1889, and VM/SP IPO/E General Information Manual, published by International Business Machines Corporation in October of 1984.

Advanced Communications Facility (ACF)/Virtual Terminal Application Monitor (VTAM)

ACF/VTAM 2002 is the communication monitor that executes under the control of the operating system and controls the communication link to the CBX and each terminal that is attached to the host. VTAM controls the Systems Network Architecture (SNA) environment that supports the LU 6.2 protocol. A detailed description of VTAM is provided in the following references all published by International Business Machines Corporation: VTAM NCP SNA SNI NLDM SSP NCCF, SC27-0659 (October 1984); IMS LU 6.1 Adapter, for LU 6.2 Applications, SH20-9254 (September 1987); Systems Network Architecture: Sessions Between Logical Units, GC20-1868 (November 1985); SNA Transaction Programmer's Reference Manual For LU Type 6.2, GC30-3084 (November 1985).

This last manual presents detailed information on the functions that the SNA LU 6.2 2008 protocol provides to application programs. The manual is written for individuals that design application programs for use on an implementation of SNA LU type 6.2. It does not describe any specific IBM product; it is intended to be used with IBM products such as CICS/VS, VTAM and MVS/XA.

Customer Information Control System (CICS)

CICS 2006 is a general purpose data communication monitor that reduces the effort necessary to implement terminal-oriented transaction applications. CICS is used around the world to enable applications, ranging from payroll to inventory control, to interactively handle a large number of displays.

A description of the operation of this system can be found in the Customer Information Control System/Virtual Storage (CICS/VS) General Information Manual, GC33-0155-1 (February 1987) published by International Business Machines Corporation. A more detailed description of the logic of CICS is provided in CICS/OS/VS Version 1 Release 7 Modification 0 (MVS/XA Feature) Listings, LYA4-3018 (November 1985); and CICS/VS, LIC Prog 5740-xx1, Logic, LY33-6034 (September 1979); published by International Business Machines Corporation.

CICS Applications

The CMCS applications 2010 and the User applications 2014 are all implemented as CICS application programs. The user applications 2014 interface to CMCS through the Application Programming Interface (API) 2018. An application program can acquire status information and access the CMCS logs 2020, 2022 and 2024 through the API. This information can be used to coordinate the display of information from application programs in addition to the information displayed by the CMCS system.

Functional Description

A functional description of the CMCS processing is provided to illustrate the system operation. For purposes of this description, the following terms are used:

Initial Screen is the first screen that the CMCS agent gets when a call is processed. Once the CMCS agent enters the customer identification, such as an account number or a name, the screen becomes a customer information display.

Customer Information Screen is the screen that a CMCS agent gets if the call has already been screened by another employee.

Normal Extension is an extension that has a physical appearance to a phone, as contrasted with ACD pilots or Phonemail pilots.

Extension is considered the extension normally associated with a phone (normal extension) unless a qualifier appears before extension.

CMCS caller is a trunk or extension that calls a CMCS called party.

CMCS called party is an extension, an ACD agent, an ACD group, an ATC, or trunk which generates CMCS telephony activity events.

CMCS agent refers to the operator, phone and host display terminal associated with a particular agent.

Telephone activity is any call activity that occurs on a CMCS called party extension, for example: ring a CMCS called party or queue for an ACD group tagged as a CMCS called party.

Flagged CMCS called party is a CMCS called party which has the ability to turn CMCS event generation on for all subsequent telephony activity.

"First Time" CMCS event is the first CMCS event with special initial call flag set in the event that is sent when a CMCS caller has telephony activity with any flagged CMCS called party for the first time.

Normal Transfer

To limit the volume of events that are sent from the CBX and to identify callers that have dealt with CMCS sometime during the call, target extensions are tagged as CMCS. A target extension is equivalent to a CMCS called party. If a caller has telephony activity with a CMCS called party, then the caller is tagged as a CMCS caller. This is a dynamic tag and remains active until the CMCS caller becomes idle.

Events are sent from the CBX to the host for telephony activities associated with a CMCS caller and CMCS target. Examples of the processing and transactions associated with the events are provided in the sample scenarios. Note that once a caller is tagged as a CMCS caller, events are sent for all subsequent telephony activity until the call is finished. CMCS callers can be trunks or normal extensions exclusively. CMCS called parties can be ACD group pilots, normal extensions, ATCs, and trunks.

Only one display terminal is associated with the activity of an individual extension. For example, suppose that an extension has multiple appearances on two phones. Then, any telephony activity on those two phones with that extension affect the display of information on the display terminal.

A CMCS called party that is being rung by a CMCS caller is presented with the initial customer screen or the customer information display terminal screen that the previous CMCS called party was viewing. Also, as a CMCS caller transfers forward to other CMCS called parties, the display terminal of each successive CMCS called party is updated with either the initial screen or the customer information screen.

Blind Transfer

A blind transfer is a special type of transfer which transfers the display terminal screen that the CMCS called party (transferrer) was viewing to the transferred CMCS party while the call is ringing. This allows the agent some additional preparation time before answering the call.

Host Activities

The host is updated each time the status of a CMCS caller and CMCS called party changes. A status change occurs when a call follows busy, DND or station forwarding. The host also knows when a CMCS caller places a CMCS extension on hold. The host processing is handled by CICS application programs that are individually discussed below. FIG. 23 is an overview block diagram of the CMCS application environment as they relate to the present invention.

Call Tracking Program

The call tracking application program includes the LU 6.2 communication manager. The primary function of call tracking is to maintain the call status on the event stream and resolve any ambiguities before reporting events to other applications. If call tracking determines that a transaction associated with an originating source identification (extension) needs updating, it refers the event to the Screen Update program. Queued events and events regarding source identification which contributed to a queue count are passed to ACD load balancing.

Screen Update Program

Screen update application program performs screen transfer, initialization and recovery for each call. The processing is triggered by events on the CMCS host control link which the call tracking program passes to it.

CMCS Management Information Systems (MIS) Program

CMCS MIS program receives the CMCS table entries maintained for each call tracking every change of state, data entry field and queue count. The CMCS MIS program puts these records into a circular buffer 2020 of FIG. 23 to store the information for other applications to process.

CMCS Administration/Maintenance Program

This program processes the CMCS table entries to allow a CMCS operator to interrogate error conditions and monitor events on CBX source and target identifications (extensions). This program also configures the CMCS system and maintains the configuration file 2024 of FIG. 23.

CMCS Customer Application

CMCS customer applications are any CICS application programs. For purposes of our discussion, we will discuss a single CMCS customer application program that maintain a database of customer information for CMCS agents. In reality, there are many CICS applications currently used for such diverse applications as accounts payable, accounts receivable, inventory control, stock queries and order entry. By providing an interface to existing applications, CMCS coordinates the display of information on a display terminal with the transfer of phone calls without changing existing CICS applications.

LOGIC DESCRIPTION

Coordinated Voice and Data Display

Figure 7:
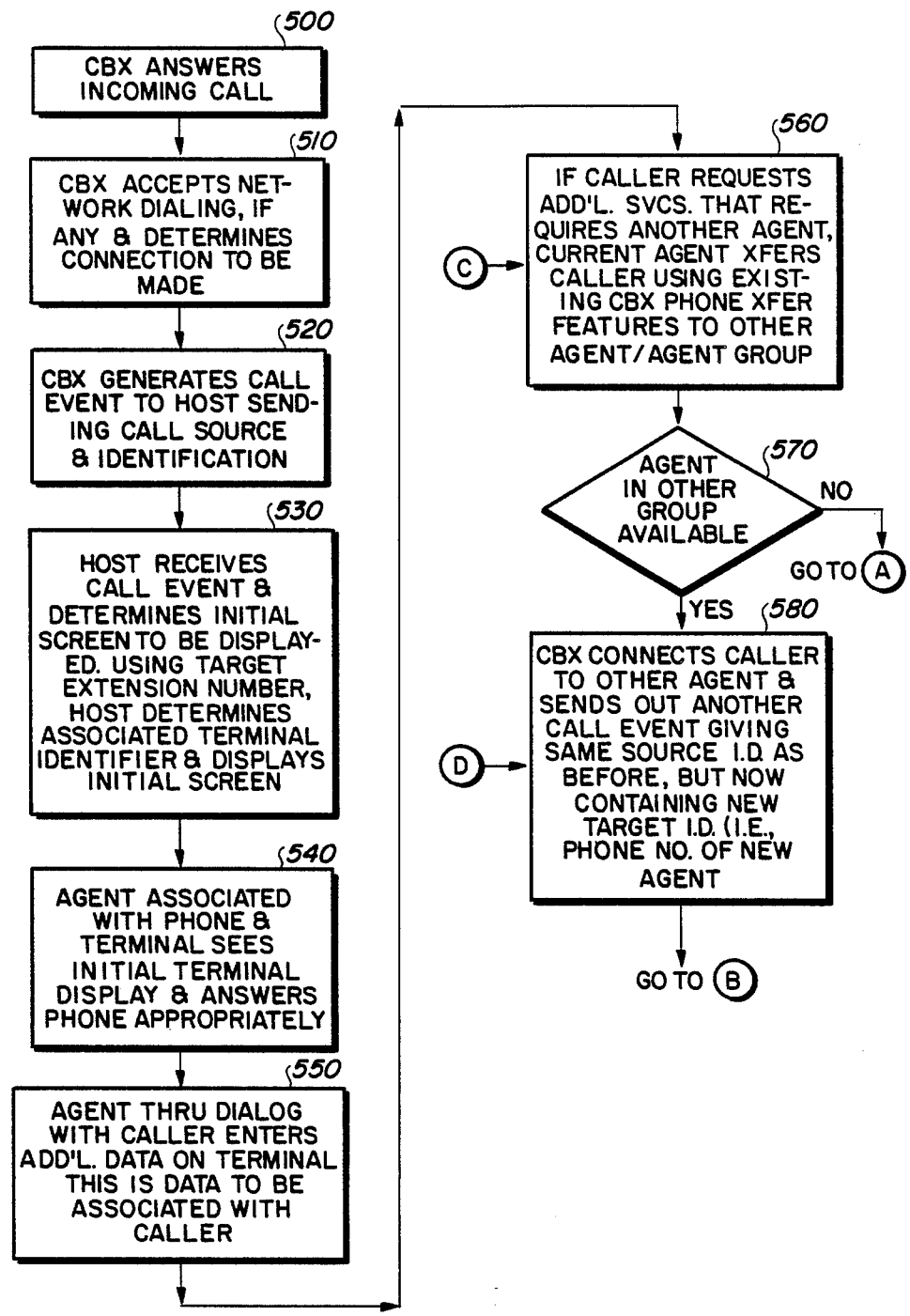
FIG. 7 is a flowchart of the logic of the Call Management Control System in accordance with the present invention.

Referring to FIG. 7, a flowchart is shown that provides the logic of the CMCS system. The processing begins at function block 500 where the CBX responds to the incoming call. This function block refers to normal CBX call processing as detailed in ROLM publication, ROLM CBX II 9004.3, published by International Business Machines Corporation.

Then, in function block 510 the CBX accepts the network dialing that accompanies the call and determines the correct extension to connect to. This is also normal call processing as described above. However, in function block 520, the CBX generates a call event transaction and sends it via the LU 6.2 link to the host as detailed in the Message Formats section of the Logic Description.

Call Tracking

The host Call Tracking Application, one of the CMCS applications 2010 of FIG. 23, receives the call event, parses the information and determines if this is the first event for the extension. If it is the first event, then a call event record is created in the Call Management Control Table (CMCT), shown in FIG. 18. The call event record is updated to reflect each event that affects the extension. Then, the initial screen to be displayed is determined using the incoming trunk and/or the target phone extension as shown in function block 530.

The Call Tracking Application uses the phone extensions sent from the CBX to access an extension to terminal (logical unit address (LUA)) table and determine the correct display terminal to send the screen display to. The extension to terminal (LUA) table is shown in FIG. 19.

The network used in this example contains terminal displays and phone extensions from countries around the world. The only information necessary to make the connections to the various extensions and send the display information to the correct display terminal is contained in the extension to terminal (LUA) table.

The extension to terminal (LUA) table is searched based on the sixteen byte extension of the called party to obtain the terminal LUA associated with the phone call. When a match is found between the sixteen byte extension and the first sixteen bytes of a record, the next twenty-four bytes of the record is the LUA of the associated display terminal. The host application then knows which display terminal to send the screen information to.

The CMCS Customer Application sends the initial terminal display to the display terminal, as shown in function block 540. The display terminal LUA is determined by the Call Tracking Program by searching the extension to terminal (LUA) table and acquiring the correct LUA for the associated display terminal as discussed above in reference to function block 530.

The agent who receives the call and the information on the display terminal has the option of entering additional information on the display terminal to further enhance the customer information as shown in function block 550. If the caller requests additional services that require the help of another agent, then the agent can transfer the caller using the standard call transfer features of the phone as shown in function block 560.

A test is performed at decision block 570 to determine if another agent is available in the group that is being transferred to. If an agent is not available, then control is transferred to a queue for callers that is discussed in more detail later. If an agent is available, the CBX connects the caller to the other agent and sends a call event transaction through the LU 6.2 link to the host as shown in function block 580. The transaction contains the same source identification as the previous transaction, but now it also contains the phone extension of the agent that the call is transferred to.

The host, in function block 590 of FIG. 8, receives the call event from the CBX and identifies the caller by the same source identification and matches the new target extension to the terminal LUA as discussed above by a table lookup. Then, the host CMCS screen transfer program transfers the terminal transaction associated with the previous terminal to the new terminal LUA as shown in function block 600. As a result, the terminal associated with the caller shows the customer data as the phone is ringing as shown in function block 610. This would allow the agent to assimilate the information on the terminal display and prepare for the caller as shown in function block 620. Optionally, the terminal display could be updated as soon as the phone call is answered.

The agent is now fully prepared to deal with the customer without having to ask the customer for information that has already been conveyed to the first agent. The new agent can acquire additional pertinent information and enter it into the CMCS Customer Application as shown at 630.

The application program interface, 2018 of FIG. 23, allows a customer's existing CICS application program to do optional intermediate processing during the display terminal transfer if a different display should be displayed other than the screen that was currently used at the prior display terminal.

A test is performed next at decision block 640 to determine if the caller needs to talk to another agent. If the caller needs to talk to another agent, control is passed to function block 560 of FIG. 7 to process the call. If the caller does not need additional assistance, then the caller hangs up the phone, as shown in function block 650, and the CBX notifies the host that the call is completed by sending a CALL DISCONNECT transaction to the host as shown in FIG. 13. Then, the host application CMCS Call Tracking Program cleans up the host record of the call and stores the user data collected.

The existing CBX queuing capability is used by the CMCS system as shown in FIG. 9. When a call is transferred and the party is not available, then the call is queued as shown in function block 670, and the caller listens to music on hold until the agent is available. Also, a call event transaction is sent to the host to let the host know that the previous extension is free and that the caller is now in a hold or waiting condition as indicated in function block 680 and updates the CMCT. This capability helps the host place the terminal display associated with the caller on hold and coordinate terminal display processing with the CBX.

A test is performed in decision block 690 to determine if the agent is available. If the agent is available, then control is passed to function block 580 of FIG. 7 to process the connection of the call and the display terminal update. If the agent is still not available, a test is performed at decision block 700 to determine if the caller has hung up. If the caller has not hung up, then control is passed to function block 670 to continue the hold pattern. If the caller has hung up then the CBX notifies the host of the event with a transaction as shown in function block 710 and the host cleans up the call environment, by updating the CMCT, as shown in function block 720.

CMCS Application Structure

Figure 24:
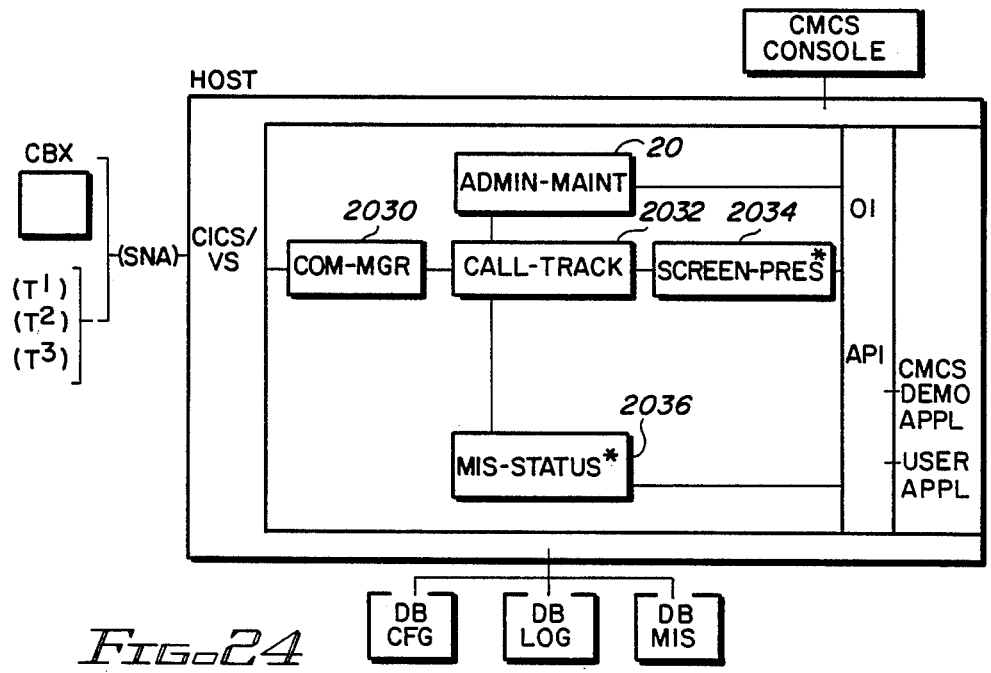
FIG. 24 is a detailed block diagram of the applications that comprise the Call Management Control System in accordance with the present invention.

FIG. 24 provides a detailed block diagram of the CMCS application programs and the communications between the applications.

Call Tracking Application

The call tracking application 2032 of FIG. 24 is comprised of subroutines for carrying out discrete functions. The first is the initialization subroutine which reads user defined configuration defaults such as the CBX ID/LU associations, the CBX access codes, error handling parameters, queue parameters and API interface parameters and determines the correct CICS transaction program application to execute to provide the screen for the display terminal associated with the phone extension.

The second subroutine is the communication manager module 2030 of FIG. 24 which is responsible for managing communication between the CBXs and the host using LU 6.2 protocol. The communication manager 2030 receives call event transactions from the CBX, sends request action messages to the CBXs, and sends/receives initialization messages with version numbers and diagnostic messages that notify the host of any changes in the CBX status. The communication manager 2030 processes the messages and writes information records to a CICS temporary storage queue to facilitate access by the other call tracking subroutines 2032.

After the communication manager 2030 receives the messages, they are read from the temporary storage queue and evaluated by the preliminary routing/error handling section of call tracking 2032 to separate error records from event transaction records.

Event transaction records that have sub function codes of call assigned or call queued are evaluated by the validation/building section of call tracking. The originating source identification is validated for "first time" calls because the same source identification is used for the duration of the call. The target identification is validated for each transaction received in call tracking because it could change during the call.

The originating source identification is required to be a CMCS trunk or an extension. To determine the initial screen display, the trunk and extension tables must be searched. The initial screen display is performed by searching the trunk to application table, the Dialed Number Indirect Service (DNIS) to application table and the extension to application table. Depending upon the match found, the appropriate CICS initial transaction identification will be used.

The search logic that is executed is presented below in pseudo-code form:

---
(1) Search TRUNK-TO-APPLICATION Table for a valid CMCS Trunk Identification
    FOUND: Is the Trunk a DNIS trunk?
        YES: Search DNIS-TO-APPLICATION Table
            FOUND: Move the initial transaction identification to the record.

---
-continued

NOT FOUND: Move the default DNIS CICS initial transaction identification to the record and set the error indicator.
NO: Move the initial transaction identification from the TRUNK-TO-APPLICATION Table into the record.
NOT FOUND: Search the: EXTENSION-TO-APPLICATION Table using the primary source identification to match on extension to determine if the extension is a CMCS extension.

---

NOTE: A detailed discussion of the CMCS system tables is provided later in the detailed logic A similar procedure is used for queued calls. If the queued call is a "first time" queued call, then the call is validated as discussed above. However, if it is not the first time the call generated an event, then there is no need to validate.

A major function of the call tracking application is to track the status of CMCS calls. The call management control table is used to store status information on CMCS calls. Calls remain in the Call Management Control Table (CMCT) as they are assigned and queued. They are not removed from the CMCT until a disconnect transaction is received from the CBX.

After the event record has been validated and the record containing host applications and terminal LUA has been built, the call tracking application performs CMCT validation before placing built event records in the CMCT or removing a call from the CMCT. Each time the CMCT is updated, a copy of the table entry is sent to the MIS interface.

The logic of the CMCT validation check is presented below:

"FIRST TIME" CALL RECORDS

For event records which have a "first time" call indicated, there should be no entry in the CMCT for the originating source identification. If there is, the entry is written to the error log, deleted from the CMCT, and the new record is placed in the CMCT. Also, the queued flag for the entry must be checked before removal. If the flag is set, then the Queue Table Queue Count for the target extension is decremented.

Non-"First Time" Call Records

Records which do not have the "first time" call flag indicated should already exist in the CMCT. The CMCT is searched on originating source identification to obtain the information associated with the call. If no match is found an error situation is written to the error log and the new information written to the CMCT by the update code.

After records pass the validation checks, the built record is evaluated to determine of the record is added, deleted, updated or unchanged in CMCT.

CMCT Updates

An addition of a record to the CMCT is performed if the record is queued or assigned and not in the CMCT. If a record is flagged as "first time" and Assigned, then the ASSIGNED flag is set and the QUEUED flag is cleared. If a record is flagged as "first time" and queued, then the ASSIGNED flag is cleared and the QUEUED is set. If a record is not "first time" and ASSIGNED, then the ASSIGNED flag is set and the QUEUED flag is cleared. If a record is not "first time" and queued, then QUEUED is set and the ASSIGNED is cleared.

Updates occur each time that a call status changes to reflect the new condition. The current terminal identification changes each time a phone call is transferred to reflect the current terminal associated with the phone extension. The assigned and queued flags are changed to reflect current status as described above.

Notification of the Screen Presentation Application Screen presentation is notified when any of the following events occur:
 (1) a call is received with "first time" indicated;
 (2) a call is queued;
 (3) a call is assigned; and
 (4) a call is disconnected.

Depending on the previous and current changes to the CMCT entry, the CMCS call tracking application passes action required parameters to the screen presentation application. These parameters include the following:

START: issued for "first time" calls that are assigned or when a call that was queued for the first time becomes assigned.

SAVE: issued when a call which was assigned is now queued. For example, when a call is transferred and put in queue on hold.

RESTORE: issued when a call that was queued (and not a "first time" call) becomes assigned.

TRANSFER: issued when a call that is currently assigned to an extension becomes assigned to another extension.

CLEAN-UP: issued when calls in CMCT are removed.

MIS Application

The MIS application is notified whenever there are changes made to the CMCT. The information is written to a circular file for batch processing.

Screen Update Application

The screen update application, 2034 of FIG. 24, provides the function described in function blocks 610, 620 and 630. Transfers of information from one display terminal to another are performed by updating the VTAM addressing so that the new display terminal is identical to the information on the display terminal that the agent that transferred the call was viewing. This is accomplished by substituting the LAU of the transferred to terminal display with the LAU of the transferring display and logically transferring the display terminals. An option provides for passing the update request to the user application for processing before transferring.

DETAILED CMCS TABLE ANALYSIS

Call Management Control Table (CMCT)

The CMCT is used to track the status of calls in progress and provides control functions for a call. FIG. 18 shows the CMCT and each of the fields that make up the individual records. Information concerning a phone call is initially obtained from the other tables to fill out the fields of a call record. This record is then written to the CMCT and used to record the status of the call until it is terminated.

The Sub-func code 1100 is a coded one-byte integer value. The codes and the functions associated with each code are shown in FIG. 12.

The Originating Source ID 1102 is the key that uniquely identifies the source of the call being tracked by CMCS. The ID can be a TRUNK ID or and EXTENSION ID. The Originating Source ID 1102 is kept for the duration of the phone call.

The Originating Source ID 1102 is used by the host to "track" calls in the CMCT. All messages that are tracked by the host must have an Originating Source ID 1102.

The Target ID 1104 is the termination point of the CMCS call. It can be an EXTENSION ID or a TRUNK ID. The Target ID 1104 can change during the phone call. Changes typically occur when a call is transferred. It is used to track the termination point of calls in the CMCT.

The Term ID 1106 is the unique four bytes of character identification for the 3270 terminal that is currently associated with a call. The 3270 terminal could be a personal computer or other 3270 emulated terminal.

When a call is transferred, the TERM Id 1106 that is currently associated with that call is written to the CMCT by the call tracking application. It is also used by the screen presentation application to determine where to obtain information from.

The Ctl # 1108 is a fifteen byte key that is used by the CICS applications to identify any call being managed by CMCS. This key can be used to obtain status information from the various logs that CMCS manages.

The Initial CICS Trans Id 1110 is a four byte code which is used by CICS to specify the transaction identifier to be used with the next input message from the terminal to which the task is attached. It is also used to identify the host application program that is invoked for an incoming call on a trunk.

The initial configuration of CMCS will match each trunk and particular extensions with CICS transaction ids. These will be stored in the Extension to Terminal Id table, DNIS table and the Trunk table.

The Q flag field 1112 is a one byte flag that is set to zero or one depending on the status of the call. If the call is in queue, then the flag is set to one. If the call is not in queue, then the flag is set to zero.

The Assign flag field 1114 is a one byte flag that is set to zero or one depending on the status of the call. A "first time" call will initially have a zero value for this field until it is assigned.

The Reserve Terminal Flag 1116 is a one bit flag that is stored in the CMCT and the Extension to Terminal table. When this flag is set to one, CMCS will not initialize the screen when a call is transferred to the display terminal associated with the extension.

The Err Ind 1118 is a one bit flag that is set to indicate an error and cleared to indicate the passing of the error condition.

The Trans Ind 1120 is a four byte field that is used to indicate the CICS transaction to be used to update the display terminal of the current Term Id 1106.

The Rec Ind 1122 is a system flag that is used to differentiate various transactions.

The Date 1124 and Time 1126 fields are six byte records that track the date and time of the last update of the CMCT.

Extension to Terminal Table

The Extension to Terminal table is shown in FIG. 19. The table is depicted as a sequential file with forty byte records containing a sixteen byte phone Extension ID 1130 and a twenty-four byte Terminal ID (LUA) 1132. The LUA distinctly defines each terminal in a worldwide network.

The Reserve Terminal Flag 1134 is a one byte flag that is stored in the CMCT and the Extension to Terminal table. When this flag is set to one, CMCS will not initialize the screen when a call is transferred to the display terminal associated with the extension.

The Initial CICS Trans Id 1136 is a four byte code which is used by CICS to specify the transaction identifier to be used with the next input message from the terminal to which the task is attached. It is also used to identify the host application program that is invoked for an incoming call on a trunk.

The Transfer Notify Indicator 1138 is a one byte flag that is set to indicate that the terminal is to be updated before the call is answered. If it is cleared, then the terminal will not be updated until the call is answered.

The Recovery Notify Indicator 1140 is used to indicate that CMCS is in recovery mode following a failure.

Trunk To Application Table

This table, shown in FIG. 20, is used to associate an incoming trunk with the host initial CICS transaction that is to be invoked to send information to the display terminal associated with a particular trunk.

The Trunk ID 1150 is ten byte identifier of the external telephone line that over which the CBX receives the incoming customer call. Trunks to be monitored by the CMCS system are flagged during initial configuration by the Administration application. The last three digits of the identifier are the unique CBX identifier of the particular CBX from which the trunk entered the CMCS system.

The DNIS Trunk Flag 1152 is a one byte flag that is set to indicate that a dialed number indirect service was used to access the phone. If this indicator is set, the DNIS to Application table will have to be searched to determine the correct initial CICS application.

The Initial CICS Trans Id 1154 is a four byte code which is used by CICS to specify the transaction identifier to be used with the next input message from the terminal to which the task is attached. It is also used to identify the host application program that is invoked for an incoming call on a trunk.

DNIS to Application Table

This table, shown in FIG. 21, is used to associate an incoming DNIS Trunk with the correct initial CICS transaction to invoke at the agent's terminal. The Target ID 1104 of the CMCT is used to match the Target DNIS ID 1156 of this table to determine the correct Initial CICS Trans ID 1158.

The Initial CICS Trans Id 1158 is a four byte code which is used by CICS to specify the transaction identifier to be used with the next input message from the terminal to which the task is attached. It is also used to identify the host application program that is invoked for an incoming call on a trunk.

Queue Count Table

The queue count table is used to monitor the number of calls in queue. The records are fixed length with entries for the call extension and other queue information.

While a sequential file is used to depict the various tables, one of ordinary skill in the art will recognize that a linked list, hashed table or other similar file arrangement could readily be substituted for the sequential file.

Message Formats

The communication transactions employed by CMCS to transfer information from the CBX to the host via the LU 6.2 link all conform with the IBM General Data Stream which is defined in Chapter Fourteen of Systems Network Architecture Reference Summary, GA27-3136, published by International Business Machines Corporation. The General Data Stream (GDS) Record's structure is shown in FIG. 10.

A two byte length field 1000 is first and contains the integer length in bytes of the transaction excluding the header information. The two byte field following this record 1010 is the application message type and is always set to Hex 12FF. Next, the variable length message data 1020 is concatenated. The length of this information is dependent on the function 1021 and subfunction 1023. The function 1021 is a one byte field that specifies one of the four functions listed in FIG. 11. The subfunction field 1023 specifies the specific subfunction to perform under the control of the function 1021. Also, the subfunctions are listed in FIG. 11. An additional table of proper groupings of the functions and subfunctions is provided in FIG. 12.

FIG. 13 illustrates the proper format for the date and time fields which occupy the Date Time field 1025 in FIG. 10. The data 1027 resides in the next field and is variable length based on the function 1021 and subfunction 1023. Finally, the one byte Flag field 1029 trails the transaction. The types of flags and their meanings are shown in FIG. 13.

Basic Transaction Flow

A session has to be initiated between the CBX and the host application before message data 1020 can be exchanged. A message is sent to the host and VTAM to initiate the session between the host application and the CBX. This initiates the single session that is used for all communications between the CBX and the host. The session is initiated by the message: SESSION:-LOG_ON(APPLID); where APPLID=application name (CMCS in our case). One of ordinary skill in the programming art would readily envision additional host sessions to enable additional transaction traffic if it were necessary. FIGS. 14 to FIG. 17 are provided to provide the details of the transactions that are used to process the most common transactions between the CBX and the host.

FIG. 14 shows the transaction that is used to report that a call has been abandoned.

FIG. 15 depicts the transaction that is used to report that a call has been successfully transferred to a port on the CBX.

FIG. 16 shows the transaction that is used to report that a call has been successfully connected.

FIG. 17 shows the transaction that is used to report that a call has been directed to a group and is assigned to a specific port.

Display States

The display terminal associated with each phone is in one of three states at any time as depicted in FIG. 22.

The three states are the idle state 1200, the display state 1210 and the held state 1220. The idle state 1200 occurs when a call has been disconnected from the phone associated with the display terminal. The transition from idle to display processing 1202 is the step that determines which display information to initially display on a terminal and initializes the status records on the host and the CBX. Also, if no terminal exists for the extension, then following processing the held state 1220 is entered. The clean-up process 1204 references the step of saving the information associated with the previous display and the completion status upon call disconnect.

The Display state 1210 is the collection of information using the display terminal to interface to the agent. During the Display state 1210, a move operation 1206 may be necessary to transfer from one terminal to another during the course of a phone call. To effect a move to another extension, a CALL ASSIGN is sent from the CBX to the host and a CALL CONNECT is subsequently sent when the connection to the new extension is completed. An activate 1214 operation is used to display information when a phone has become free after being in the Hold state 1220. The freeze operation 1212 stops display action and saves the current status before entering the Held state 1220 such as a caller being queued upon transfer from another agent.

The Held state 1220 occurs when the caller is waiting for an agent to become available. The clean-up operation 1224 is used to save the information associated with the previous display and the completed status of the operation when the caller hangs up in the Held state 1220. The queue and initialize operation 1222 is used when a caller executes a transfer operation and the agent is on the phone. The operation queues up the calls waiting for the agent to become free and initializes the call when the agent becomes available.

Administration Application

The Administration Application of the CMCS system is primarily responsible for the configuration and management of the system. The CICS displays that are used by the application to configure and manage the system are shown in FIGS. 25 to 30.

FIG. 25 is the View Call Management Control Tracking Table screen. It is used by the system operator to dynamically view changes to the Call Management Control Table (CMCT). Most of the fields of the CMCT can be viewed from this display.

FIG. 26 is the Extension to Terminal Correlation Table configurator. It is used to dynamically view and maintain the Extension to Terminal Table. The display allows a system operator to associate terminal ids with phone extensions and CICS application ids. This provides the linkage to enable a particular screen of information to be displayed in response to a transfer of a phone call.

FIG. 27 is the Trunk Id to Application correlation table configurator. This display is used to view and maintain the Trunk Id to Application Table. The fields of the table can be updated dynamically by a system operator with this display.

FIG. 28 is the DNIS Trunk Application Correlation Table configurator. This display is used to view and maintain the DNIS Id to Application table.

FIG. 29 is the Agent Extension to Terminal Correlation configurator. This display will be used by agents to configure their display terminal when a logon is performed and update the extension to terminal correlation table shown in FIG. 26. These displays are standard CICS display screens which have displayable fields indicated by XXXXXX, user entry locations indicated by _____ and user entry fields with a user supplied default indicated by #########. The field names on the display correspond to the fields discussed with the associated tables that are configured by the displays.

Sample Scenarios

The first sample scenario is a call from any source to a CMCS agent. The originating call comes from a party (P1) to an extension (P2). The actions are separated into CBX actions, outgoing call event transaction and host actions.

| CBX | Event | Host |
|---|---|---|
| P1 come in rings P2 | CALL_ASSIGN(P1, P2, First) | |
| | | S(P1,Init (I)) → T(P2) |
| P2 answers | CALL_CONNECT(P1,P2) | |
| P1 Hangs Up | CALL_DISCONNECT (P1,P2) | S(P1,Clean-up(C)) → Clear |

Note: T(P2)—Terminal on which the screen is displayed as determined by lookup of the extension P2 in the phone to terminal (application) table.

S(P1, X)—Screen associated with the origination source identification P1 with state transition X.

The second call scenario is a pair of successive calls to the same CMCS agent. Party 1 (P1) is the originator of the call. Party 2 (P2) is the agent's extension. Party 3 (P3) is another calling source.

| CBX | Event | Host |
|---|---|---|
| P1 rings P2 | CALL_ASSIGN(P1, P2, First) | |
| | | S(P1,I) → T(P2) |
| P2 answers | CALL_CONNECT(P1,P2) | |
| P1 Hangs Up | CALL_DISCONNECT(P1,P2) | |
| | | S(P1,C) → Clear |
| P3 rings P2 | CALL_ASSIGN(P3,P2, First) | |
| | | S(P1,I) → T(P2) |
| P2 answers | CALL_CONNECT(P3,P2) | |
| P3 Hangs Up | CALL_DISCONNECT(P3,P2) | S(P3,C) → Cleared |

The third call scenario is a call in which the calling part hangs up before the call is answered. Party 1 (P1) is the originator of the call. Party 2 (P2) is the agent's extension.

| CBX | Event | Host |
|---|---|---|
| P1 rings P2 | CALL_ASSIGN(P1,P2, First) | S(P1,I) → T(P2) |
| P1 Hangs Up | CALL_ABANDON(P1) | S(P1,C) → Clear |

The fourth call scenario is an example of a call that is transferred. Party 1 (P1) is the originator of the call.

Party 2 (P2) is the first party's extension (transferer).
Party 3 (P3) is the second party's extension.

| CBX | Event | ! | Host |
|---|---|---|---|
| P1 rings P2 | CALL_ASSIGN(P1, P2, First) | | |
| | | | S(P1,I) → T(P2) |
| P2 answers | CALL_CONNECT(P1,P2) | | |
| P2 flashes | PARTY_HOLD(P2,P1) | | |
| P2 rings P3 | CALL_ASSIGN(P2,P3, First) | | |
| | | | S(P2,1) → T(P3) |
| P3 answers | CALL_CONNECT(P2,P3) | | |
| P2 hangs up | CALL_TRANSFER(P1,P3,P2) | | |
| | | | S(P1,Move(M)) → T(P3) |
| | CALL_DISCONNECT(P2,P3) | | S(P2,C) → cleared |
| P1 hangs up | CALL_DISCONNECT(P1,P3) | | S(P1,M) → cleared |

The fifth scenario is an example of a conference call. Party 1 (P1 in) is the originator of the call. Party 2 (P2) is the first party's extension. Party 3 (P3) is the second party's extension.

| CBX | Event | ! | Host |
|---|---|---|---|
| P1 rings P2 | CALL_ASSIGN(P1, P2, First) | | |
| | | | S(P1,I) → T(P2) |
| P2 answers | CALL_CONNECT(P1,P2) | | |
| P2 flashes | PARTY_HOLD(P2,P1) | | |
| P2 rings P3 | CALL_ASSIGN(P2,P3, First) | | |
| | | | S(P2,I) → T(P3) |
| P3 answers | CALL_CONNECT(P2,P3) | | |
| P2 flashes | PARTY_HOLD(P2,P1) | | |
| P2 presses conference button | PARTY_ADD(P3,P2) | | Host adds P3 to the conference |
| P2 hangs up | PARTY_DROP(P2) | | S(P1,M) → T(P3) |
| P1 hangs up | CALL_DISCONNECT(P3,P1) | | S(P1,M) → cleared |
| | CALL_DISCONNECT(P1) | | |

AUTOMATIC CALL DISTRIBUTION (ACD) LOAD BALANCING

Marketing applications often require the use of specific sets of agents to handle various sales applications. Telephone switches have provided Automatic Call Distribution (ACD) processing that distributes a high volume of calls arriving on a dedicated trunk to a set of associated telephone extensions. ACD groups were defined to service a particular type of call such as brokerage, loan information, savings account information and home loans. By distributing skilled personnel and automatically allocating calls based on availability, increased productivity is achieved with accompanying customer satisfaction.

ACD processing employs a pilot number that acts as the entry point to all the agents associated with a particular marketing area. The pilot number is linked to each of the available agents capable of servicing the particular type of call. For example, a company may have a single number that can be dialed to reach a company operator to obtain the direct extension of an employee of the company. This number could actually be a pilot number that is linked to ten company operators that handle calls as they are available. This approach works fine as long as one of the operators is always available to receive the next call. However, if all operators are on the line, then the next call will be required to enter a queue or experience a busy-signal. Often an additional agent group will be added to handle the overflow calls or agent groups are distributed in different locations to cover various time zone. Distributing staffing also provides local customer access to agents. Thus, it is important to balance calls between available agent groups.

ACD load balancing maintains queue counts on ACD pilot groups which are to be balanced together. A load balancing algorithm determines where callers should be transferred. Two modes of load balancing are provided. The first mode uses host administered load balancing pilot numbers. A group of pilot numbers are configured in each CBX for each ACD group. The pilot numbers in a group each forward to the same ACD pilot number. Each pilot number is a CBX hunt group pilot put into busy forwarding to the ACD pilot number and configured with the CMCS class of service. These hunt groups have no extensions configured as members of the hunt group, so they always forward immediately. The CMCS/Host administers the numbers. When the user's host application request a call to a particular ACD service (e.g. loan officer) from the CMCS/Host, the CMCS/Host application selects which ACD group to send the caller to.

The CMCS/Host reserves a primary load balance pilot number and passes it to the user's application program through an Application Program Interface (API) along with a backup number which can be used if the transfer to the primary number is unsuccessful. The backup number represents the pilot number of the desired service in the requesting agent's CBX. The user's application program displays the primary number to the agent's terminal. The agent uses a screen transfer to transfer the caller to the primary load balance pilot number. The host can identify the caller transferred across any private line network to the reserved load balance point number and automatically pick up tracking the call again as they forward to the target ACD group.

When the host picks up the call, the host notifies the agent transferring the caller that tracking has recommenced and that the transfer is successful. The host conveys this information to the agent via a screen prompt.

If information is transferred to a display associated to the phone within a certain time period, the transferring agent determines that the primary load balance number was not successful, then the caller is returned to the transferring agent and then is sent to the backup number and the information is transferred to the display associated with the backup number.

The second mode is limited to ROLM networks with satellite operations connecting each of the CBXs. In the second mode, the first event out of the terminating CBX with CMCS also includes the extension number of the CMCS called-party that transferred the caller over the satellite tielines. This extension number plus the reserved pilot number insures no ambiguity exists in identifying the caller at the terminating switch.

When load balancing occurs between ACD groups in the same CBX, the load balancing algorithm detects that the groups are in the same CBX and load balances directly to the ACD groups without the use of reserved pilot groups.

The Load Balancing module is accessed by a CICS link from the CMCS Call Tracking Manager whenever a call is queued or dequeued. Actual queuing information is kept in real time. Thus, when the call is processed it is based on an analysis of current ACD queue utilization. The Load Balancing module accesses the Originating_Source_ID and Queue_Count in the CICS data area and the fields in the Queue Count Table. Internally, it maintains a table of hunt distribution pilot numbers for each primary pilot number in the queue count table so that these numbers can be marked as reserved when appropriate and timed to space agent call assignments evenly.

The table maintained and used by load balancing is the Queue Count Table. It contains user defined and maintained data including the Pilot Groups that are to be balanced. The CBX ID is appended to each of the Pilot Group IDs to enable the Communications Manager to route the new target number to the CBX for call redirection. Also, this table contains an Agent Function Description field that can be used by user-written applications to provide users with Pilot Group numbers that correspond to functional group descriptions. This field also serves to clarify how ACD groups are administered and contains fields that manage time zone overlaps.

Figure 30:
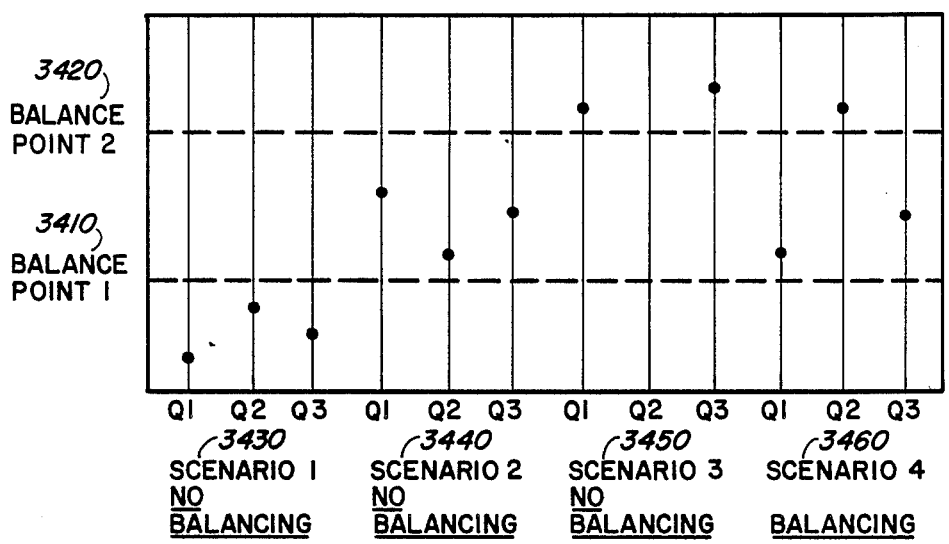
FIG. 30 is an illustration of the Balance Point Processing in accordance with the present invention.

Queue Count Balance Points are the criteria which determine when load balancing is performed. FIG. 30 illustrates the usage of Balance Points. Balance Point One 3410 and Balance Point Two 3420 represent the floor and ceiling, respectively, of the range of queued calls used to determine when calls are balanced. The balance point variables are entered by a CMCS administrator to establish how a particular ACD pilot number is to be balanced. Neither balance point is meaningful without the other and neither queue count is meaningful without the others.

Load balancing is accomplished by monitoring the number of calls in each pilot group and comparing this to the current queue level parameters and the number of calls in other pilot group queues. Load balancing functions are illustrated in FIG. 30. Scenario one 3430 shows all queues below balance point one, so no load balancing is required. Scenario two 3440 shows all queues are above balance point two, so no load balancing is required. Scenario three 3450 shows that all queues are between the balance points, so no load balancing is required.

If queues are not all within the range determined by the balance points, queues above Balance Point 2 are redirected to queues below Balance Point 2. The redirection is accomplished by scanning the Queue Count Table for the first queue group that is below Balance Point 2. This queue group would be the group to which the call is redirected. Primary and Backup dial numbers are used for call redirection. The Backup Dial number is used only when call direction is required and a transfer to the Primary number is unsuccessful (e.g. network is congested or busy).

Load Balancing Module

The Load Balancing module has three separate functions which will be requested by subroutine calls with fixed parameter lists:

1. Determine the target pilot number using the load balancing algorithm (defined later), when a User Program requests a load balanced number via the API. It will look up the reserved BFW/Pilot table for an available number, mark it reserved for the terminal from which it was requested, update the table and send the reserved number to the Load Balancing API program and the API will send it to the User Program as the Primary Dial number. The API at the same time will update CMCT for use by Call Tracking Manager.

2. Update Queue Count field on the CMCS Queue Count Table. The Call Tracking Manager will send information to Load Balancing when the queue count is to be incremented or decremented.

3. When a Transfer is complete (and some other cases), Call Tracking will request via the API, an update of the Reserved BFW/Pilot table to remove the reserved flag from the table entry and update the table.

Administrator Load Balancing Queue Count Screen

Used to view and maintain the Load Balancing Queue Count Table. Pilot Group IDs entered must correspond to pilot Groups in CBXs which are Load Balanced. After the cursor is positioned at the desired pilot number, F2 will transfer to the next screen which allows entry of all reserved BFW/Pilot extensions for each target pilot number.

BFW/PILOT NUMBERS IN CMCS

A typical telephone network consists of one or more CBXs. Within the CBX there are several pilot numbers. Each pilot number can have several extensions to which a call can be assigned by the CBX depending on availability.

Some of these pilot numbers can be configured on the CBX as dummy Busy Forward (BFW) and forward to a common ACD pilot number. The significance of using this feature in CMCS is to force the CBX to send an event message to the host that will contain the BFW/pilot number and thus identify the call across CBXs (the incoming trunk id changes as the call is transferred from one CBX to another).

Example of Reserved BFW/Pilot number to Target pilot number relationship:

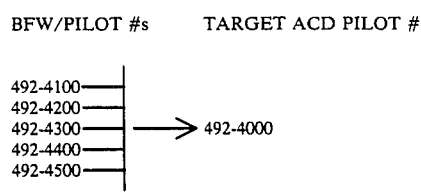

ACD Queue Group

The Queue Count Table allows a user to group certain pilot numbers in an ACD queue group. This provides a generic key for requesting an available telephone number from load balancing program.

Example of ACD Queue Group to Pilot # relationship:

| CBX ID | ACD QUEUE | TARGET PILOT # | (EXTENSIONS) not part of q cntl tbl. | | | |
|---|---|---|---|---|---|---|
| CBX1 | BROKER | 492-4000 | 4001 | 4002 | 4003 | 4004 |
| CBX1 | BROKER | 492-5000 | 5001 | 5002 | 5003 | 5004 |
| CBX1 | BROKER | 492-6000 | 6001 | 6002 | 6003 | 6004 |
| CBX1 | LOAN OFF. | 492-7000 | 7001 | 7002 | 7003 | 7004 |
| CBX1 | LOAN OFF. | 492-8000 | 8001 | 8002 | 8003 | 8004 |
| CBX1 | CUST SRV. | 492-9000 | 9001 | 9002 | 9003 | 9004 |

The extensions are not part of the Queue Count Table, they are configured on the CBX as extensions of the pilot number, so a call coming into a pilot number can ring on any one of the available extensions.

BALANCE POINTS

Two balance points for each pilot group are to be determined by a customer. The initial value should be an estimate which can be monitored and fine tuned at a later point after the system has been in usage.

Balance point 1 is an estimate of the number of calls in a queue group that a pilot group can handle comfortably at any given instance.

Balance point 2 is an estimate of the maximum number of calls in a queue group that the pilot group can handle before it is overloaded.

CURRENT QUEUE LEVEL

Level 0—If the number of calls in queue is less than balance point 1.

Level 1—If the number of calls is between balance point 1 and balance point 2, inclusive of B1.

Level 2—If the number is greater than or equal to Balance point 2.

Example: For B1=3 and B2=7; Level 1=0-3; Level 2=3-6; Level 3=7-999.

Current queue count is updated by the program internally so it cannot be updated by the user. However by looking at the queue level the administrator can adjust balance points to shift the load from some busy numbers to less busy numbers.

QUEUE COUNT

Each time a call is queued to a target pilot number, Call Tracking will issue an API to load balancing to increment the count on the queue count table. On the other hand each time a call is assigned or abandoned, Call tracking will invoke a Load Balancing module to decrement the queue count. Every time the count is changed the queue level is recalculated and the table is updated.

BACKUP DIAL NUMBER

This number is sent along with the reserved BFW/Pilot (primary) to the user program. If the primary number cannot be dialed because of problems in the lines or the network is overloaded, the backup number is dialed. The backup number is within the same CBX as the target pilot number.

FROM AND TO TIME-AND-DAY

These fields are provided so that different balance points can be set for different time periods in the day for the same pilot number. The format of the number is DHHMM. Where D has a value indicative of the day of the week. The first record will have blanks for time and day fields. This record will be used as the default for all times not specified in other records and also to keep the queue counts in.

HELP FUNCTION (F1)

F1 key will bring up help screens containing text about field explanations and general information. Forward and backward scrolling will be permitted within the part of the text relevant to the screen. F3 from the help screen will return to the screen from which Help was requested.

MM/DD/YY Call Management Control System CMCS/Host
Load Balancing Reserved BFW/Pilot Number Table
Targt Pilot Group ID: ######## CBX ID: XXX
AcD GRP: XXXXXXXX

| ACT | Seq Num | Network Dialing Prefix | Reserved BFW/Pilot Number | Status | Available from Time |
|---|---|---|---|---|---|
| # | XXX | ######## | ######## | X | XXXXX |
| # | XXX | ######## | ######## | X | XXXXX |
| # | XXX | ######## | ######## | X | XXXXX |
| # | XXX | ######## | ######## | X | XXXXX |
| # | XXX | ######## | ######## | X | XXXXX |
| # | XXX | ######## | ######## | X | XXXXX |
| # | XXX | ######## | ######## | X | XXXXX |
| # | XXX | ######## | ######## | X | XXXXX |
| # | XXX | ######## | ######## | X | XXXXX |
| # | XXX | ######## | ######## | X | XXXXX |
| # | XXX | ######## | ######## | X | XXXXX |
| # | XXX | ######## | ######## | X | XXXXX |

CMCS Reserved BFW/Pilot Number Table Maintenance

This table is used to enter several extension numbers that are classified as "Do Not Disturb" and forward to the Target Pilot Number displayed above. These numbers are reserved for the load balancing program to be assigned to a user program which requests a transfer number.

RESERVED BFW/PILOT NUMBER TABLE ELEMENTS

This table contains an entry for each BFW number for all target pilot numbers. The status of each BFW number is updated as it is reserved or assigned. It is the responsibility of the CMCS System Administrator to set up the entries on these tables and also to keep them parallel to the CBX configuration.

STATUS

The valid values for this field are: A (available) and R (reserved). When a user program requests a load balanced number, the program picks out a target number and then goes down through this table to reserve the first available BFW number.

AVAILABLE AFTER TIME

Once CTM assigns the call to the load balanced number that was supplied to the user program, CTM will request a release of the reserved BFW/Pilot number. The release actions include moving an 'A' to the status field and setting the available after time to the current time plus a Delay Factor (like 30 secs) which is an installation parameter determined by the customer.

NETWORK DIALING PREFIX AND RESERVED BFW/PILOT NUMBER

This field contains the first part of the complete telephone number. Typically, there will be three or four digits, although there is provision for all eight. The second part of the phone number will be saved in the Reserved BFW/Pilot number field. The length of this number is determined by the internal numbering system within the CBX. However, together the prefix and the number must not exceed eight characters.

Note: Log records will be written at various stages to keep statistics like how many times a reserved number was unavailable, or the system experienced 'blockage'. These cases need to be defined as part of the MIS LOG module.

LOAD BALANCING ALGORITHM

This algorithm is used to determine the least busy pilot number to return to the User Program. The user program will provide the ACD queue group name and the CBX Id of the related telephone (or its terminal Id, so that the Load Balancing program can pick up the CBX Id using the Terminal to Extension table). The Load Balancing algorithm scans the Queue Count table and the Reserved BFW/Pilot table to determine the best number and send it back to the User Program along with a backup number.

Search Queue Count Table for the requested ACD Queue Group within the same CBX. Use the queue count from the base entry for the pilot number (time and day fields are blank) to compute the queue level, use the balance points from the entry that corresponds to the current time and day. Save the Backup Number from this entry.

If the level is zero, perform Reserved BFW/Pilot number table lookup to get an available BFW number. If the level is greater than zero, search the rest of the queue count table for the requested ACD queue group within the same or different CBX for a pilot number with a lowest queue level. If found, perform Reserved BFW/Pilot number table lookup to get an available BFW number. If not found use a number from the original CBX, however busy it was.

Reserved BFW/Pilot Table Lookup

Search the table for the selected target pilot number. If the status is 'A' and the available-after-time is less than current time ( or spaces), select it by moving an 'R' to the status and send it back as the reserved number; check the next entries until an available number is found within the target pilot number. If none is found, go back and select another target pilot number in the requested ACD queue group. Repeat the process of finding a reserved number. If all the numbers are reserved, send back the backup number as the primary number.

SEQUENCE OF EVENTS INVOLVED IN A CALL TRANSFER (1) Agent enters the desired ACD Queue Group (e.g. BROKER) on the user application screen and hits a function key to invoke the Load Balancing Program (LBP) via the API program.

(2) LBP looks at the queue count table and picks out the best target pilot number, then looks at the corresponding BFW/Pilot number entries and reserves an available BFW/Pilot number.

(3) Load Balancing API program updates CMCT with the abbreviated number that is reserved.

(4) LBP sends back the reserved BFW/Pilot number as the primary dial number, and a Backup dial number from the Queue Count table, to the user program to be displayed on the screen.

(5) Agent performs the transfer using the primary number displayed on the screen.

(6) CBX transfers the call to CBX2.

(7) CBX2 sends a call redirect message to CTM.

(8) CTM looks up the reserved BFW/Pilot number table to determine which terminal reserved this number.

(9) CTM sends 'from' and 'to' Terminal Ids to Screen presentation to 'transfer' the screen.

(10) CTM releases BFW/Pilot number via API.

(11) CBX2 assigns the call.

Load Balancing Program

Function: There are three functions performed by the Load Balancing module:
1. Update queue count table,
2. Release reserved BFW/Pilot numbers, and
3. Select reserved BFW/pilot numbers.

The first two will be requested by the Call Tracking Manager and the third will be requested by a Load Balancing API program which is not user modifiable and serves as the interface between the User Programs Call Tracking Manager and the Load Balancing module.

Figure 31:
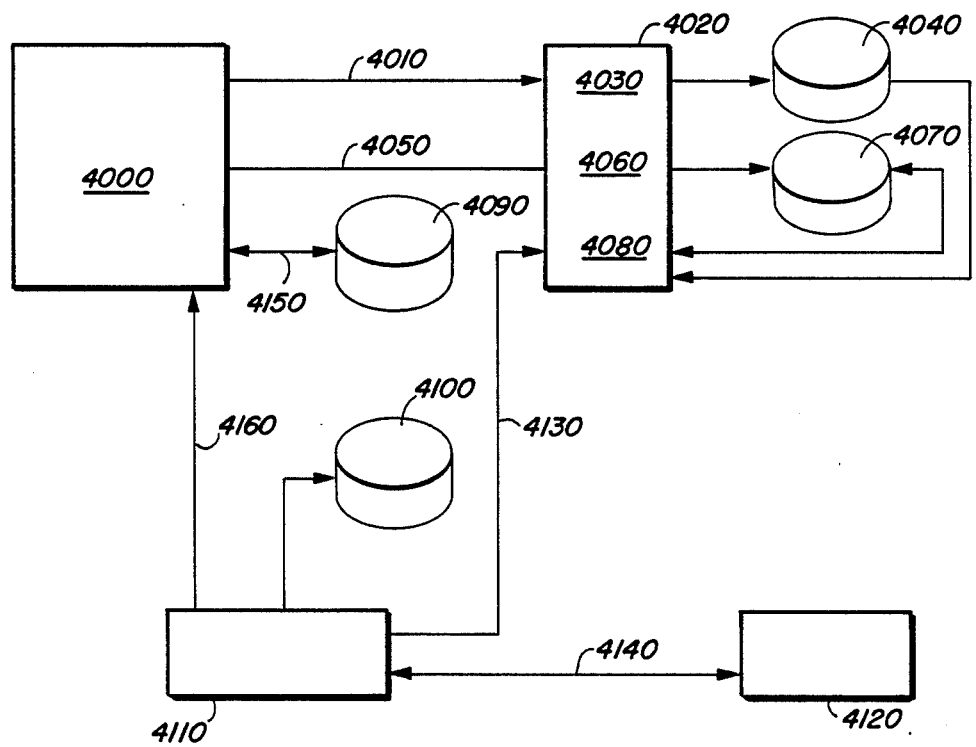
FIG. 31 is block diagram of the Load Balancing Module in accordance with the present invention.

FIG. 31 shows the interfaces between IBM code and customer modifiable code. The four arrows crossing the vertical line 4010, 4050, 4130 and 4140 represent "calls" to various parts of the Load Balancing module with a fixed parameter list. If either side makes program changes, the parameter list must stay constant in order to conserve the interface.

The Load Balancing API program 4110 MUST be used by user programs to request a load balanced number because the API conserves the defined interface for updating CMCT.

CMCS 4000 represents the call transfer manager described more fully above. When a call is transferred to an available agent group, two requests are made to update the queue control table 4010 and to release a reserved BFW number 4050. The two requests are handled by the CMCS Load Balancing program 4020, and more specifically by the update queue counts 4030 and the release reserved BFW numbers 4060. These modules update the Queue Control Table (QCT) 4040 and the Reserve BFW Table 4070 to reflect the selection of the load balanced number as shown in module 4080.

A user program 4120 must interact through a defined interface to acquire information from the queue control table 4040, the Call Management Control Table (CMCT) 4090 and the Reserve BFW Table 4070. To reserve a BFW number, calls are made to request a load balanced number via the request link 4140 to the CMCS Load Balancing API 4110. The request is relayed via the request load balance number link 4130 to select load balanced number module 4080. The number is obtained by the CMCS load balancing module 4020 from the Reserve BFW Table 4070. The number is passed back down the request link 4130 to the CMCS Load Balancing API 4110 to the CMCT 4000 through the host communication link 4160 which in turn updates the Call Management Control Table (CMCT) 4090 and the Reserve Pilot Number Table 4100 are updated to track the request. Then, the number is returned via the request link 4140 to the user program 4120.

The link format from the Call Tracking Manager 4000 and Load Balancing API 4110 program is: EXEC CICS LINK PROGRAM(LOADBAL), COMMAREA(CMCS-LOAD-BALANCING-DATA), LENGTH(COMMAREA-LENGTH).

Where CMCS-LOAD-BALANCING-DATA contains different combinations of variables depending on the function being requested, such as:

---

1. Update queue count:
Function requested (update-queue-count)
Originating source ID Queue count +1, or −1
Target pilot number for queue count update (primary)
Target pilot number where the call is queued
Return code
2. Release BFW/Pilot number:
Function requested (release-number)
Originating source ID
Target pilot number
Network dial prefix
Reserved number
Return code
3. Select reserved BFW/pilot numbers:
Function requested (reserve-number)
Originating source ID
ACD queue group
Return Target pilot number
Return Network dial prefix
Return Reserved number
Return code
Load Balancing API program: This program will first get the load balanced number by linking to the Load Balancing module upon request from the user program. Then it will update the CMCT with the reserved number received from Load Balancing, and finally send the number to the user program.

---

Network Transfer

Previous sections have described how callers into a CBX connected to a host call management application can correlate caller information on the host computer with the call processing in the CBX. In this way, as a caller in the CBX is transferred between agents, the caller's host data can be displayed on the appropriate agent's display terminal along with the caller being connected to the agent.

The network transfer capability extends this capability to calls between a plurality of CBXs. The agent at the originating CBX transfers the caller using a screen transfer to reach a specific agent in the distant CBX. Using either in-band, such as ROLM's Satellite Operations feature, or out-of-band signalling, such as ISDN called party identification, the originating CBX signals the terminating CBX that a caller is transferring using their telephone number. The terminating CBX sends this caller phone number up to the host application. The host application receives the phone number and performs a table lookup in the CMCT to identify the caller's identity and status. The information allows the host to associate the caller with an incoming port on the terminating CBX. The information also allows the host to associate the caller with future call events received from the CBX regarding caller to agent connections to effect screen transfer within the terminating CBX.

Figure 33:
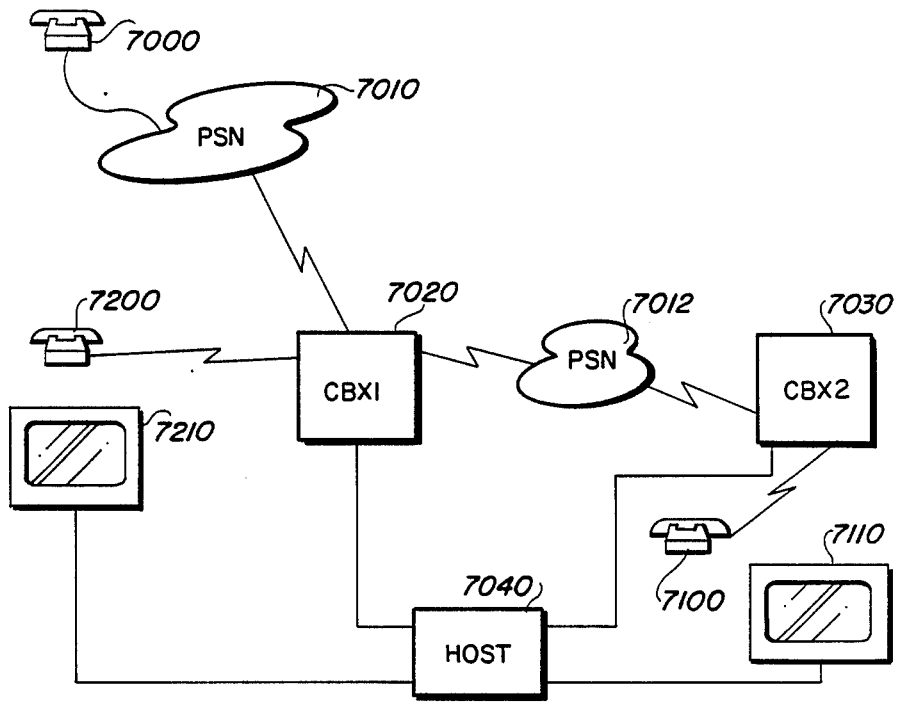
FIG. 33 is a block diagram of the network transfer capability in accordance with the present invention.

Referring to FIG. 33 a block diagram of the network transfer is presented. Two CBXs 7020 and 7030 manage incoming calls to agent phones 7200 and 7100. The CBXs communicate via trunks to the Public Switched Network (PSN) 7010. The CBXs also communicate information between them via a network 7012. The network can be an ISDN, Satellite Communications or other mediums supported by the CBXs. Callers can use phones such as 7000 to communicate to agents on either of the CBXs. The host 7040 manages the two terminals 7210 and 7110 and coordinates the transfer of display information in conjunction with telephone calls as described above. The new capability that is the subject of this invention is the call transfer from CBX1 7020 to CBX2 7030 in conjunction with the host managed transfer of information from terminal display 7210 to terminal display 7110.

Figure 32:
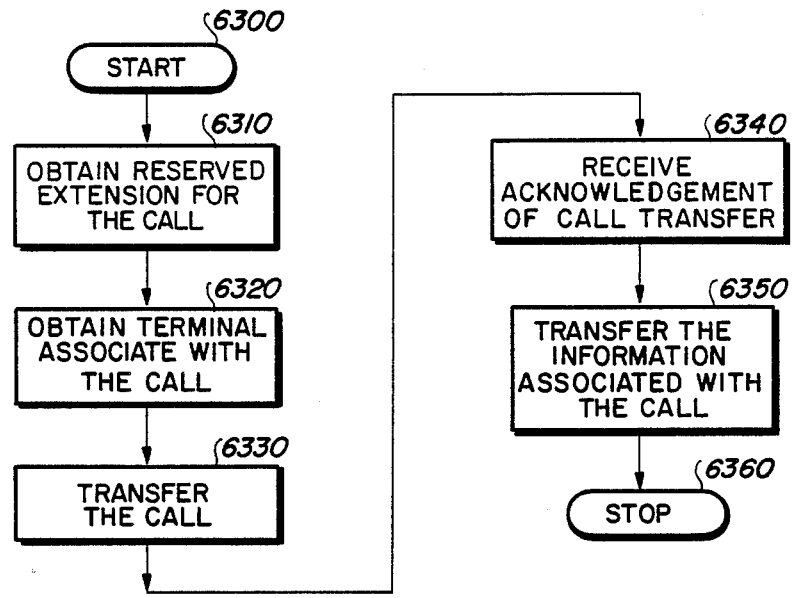
FIG. 32 is a flowchart of a call transfer through a network in accordance with the present invention.

FIG. 32 shows the logical processing of a call transfer through the network. Function block 6300 is the entry point for commencement of the processing. Control is passed from the entry to function block 6310 where the host 7040 of FIG. 33 employs the capabilities described above to obtain the reserved telephone number for the phone 7100 where the call is to be transferred to. In function block 6320, the logical terminal Id of the terminal 7110 that the information associated with the call is to be displayed on is obtained.

Then the call is transferred using the standard call transfer capabilities of the switch. This capability includes the capability of mapping calls to phones not present in the active switch, through a network 7012, to facilitate call transfer through networked switches 7020 and 7030. This capability is described in detail in the 9751 *CBX Automatic Call Distribution Supervisor Guide* and the 9751 *CBX Installation Guide with Multinode*, published by IBM (1988).

When the call is answered, an acknowledgement is sent to the originating switch 7020 and forwarded to the host application as shown in function block 6340. At this point the host 7040 transfers the display information associated with the call to the logical terminal ID associated with display terminal 7110 as shown in function block 6350. Processing is complete so the program is exited at 6360.

While the invention has been described in terms of a preferred embodiment in a specific operating system environment, those skilled in the art will recognize that the invention can be practiced, with modification, in other and different operating systems within the spirit and scope of the appended claims.

Having thus described our invention, what we claim as new and desire to secure by Letters Patent is set forth in the following claims:

1. A method of coordinating the transfer of a phone call and information associated with the phone call in a system having a plurality of phones managed by a plurality of digital switches communicating via network means, a plurality of display terminals, a host processor, and memory means for storing programs and data structures, the plurality of digital switches including memory means for storing programs and a data structure for uniquely identifying each phone by an extension, control means for selectively controlling interconnections of respective one of the plurality of phones, the host processor having memory means for storing a communication manager, data structures and application programs and communication means or communicating with the plurality of digital switches and the plurality of display terminals, said method comprising the steps of:
   (a) sending the host processor a communication in response to a call transfer via the network means, said communication containing a source phone extension and a destination phone extension;

(b) receiving said communication by the communication manager of the host processor;

(c) processing said communication and determining an associated application program and an associated display terminal to link with said destination extension; and (d) invoking said associated program to communicate via said associated display terminal to display information associated with said cell transfer.

2. A method of coordinating the transfer of a phone call and the display of information associated with the phone call, as recited in claim 1, wherein said step of processing said communication and determining an associated application program and an associated display terminal to link with said destination phone extension includes the steps of:

(a) searching said data structures in said host processor for a match of said source phone extension and a record of said data structure; and (b) retrieving an application name of said associated application program from said record of said data structure.

3. A method of coordinating the transfer of a phone call and the display of information associated with the phone call, as recited in claim 2, wherein said data structures include a trunk to application program data structure.

4. A method of coordinating the transfer of a phone call and the display of information associated with the phone call, as recited in claim 2, wherein said data structures include a phone from the plurality of phones to application program data structure.

5. A method of coordinating the transfer of a phone call and the display of information associated with the phone call, as recited in claim 1, wherein said step of processing said communication and determining an associated application program and an associated display terminal to link with said destination phone extension includes the steps of:

(a) searching said data structure in said host processor for a match of said destination phone extension and a record of said data structure; and (b) retrieving an address of said associated display terminal from said record of said data structure.

6. A method of coordinating the transfer of a phone call and the display of information, as recited in claim 1, wherein said step of invoking said associated application program to communicate with said associated display terminal to display information associated with said call transfer includes the step of updating the data structures with information associated with said transfer.

7. A method of coordinating the transfer of a phone call and the display of information, as recited in claim 1, including the step of executing an application program to initialize the data structures in the host processor.

8. A method of coordinating the transfer of a phone call and the display of information, as recited in claim 7, wherein said step of executing an application in the host, includes the step of dynamically varying the data structures.

9. A method of coordinating the transfer of a phone call and the display of information, as recited in claim 1, wherein said step of invoking said associated application program to communicate with said associated display terminal to display information associated with said call transfer includes the step of displaying information on said display terminal before the phone call is transferred.

10. A method of coordinating he transfer of a phone call and information associated with the phone call, as recited in claim 1, including the steps of:

(a) accessing the data structure in the host processor by an application program;

(b) retrieving information from said data structures; and (c) performing additional processing based on said information.

11. A method of coordinating the transfer of a phone call and the display of information, as recited in claim 1, wherein said step of sending the host processor a communication in response to a call transfer, said communication containing a source phone extension and a destination phone extension, includes the step of formatting said communication in accordance with a logical unit six dot two (LU 6.2) transaction.

12. A method of coordinating the transfer of a phone call and the display of information, as recited in claim 1, wherein said phone call is a conference call.

13. A method of coordinating the transfer of a phone call and the display of information, as recited in claim 1, wherein said phone call and information are transferred through one or more of the digital switches.

14. An apparatus for coordinating the transfer of a phone call and information associated with the phone call in a system having a plurality of phones managed by a plurality of digital switches communicating via network means, a plurality of display terminals, a host processor, and memory means for storing programs and data structures, the digital switches including memory means for storing programs and a data structure for uniquely identifying each phone by an extension, control means for selectively controlling interconnections of respective one of the plurality of phones, the host processor having memory means for storing a communication manager, data structures and applications programs and communication means for communicating with the digital switches and the plurality of display terminals, comprising:

(a) means for sending the host processor a communication in response to a call transfer via the network means, said communication containing a source phone extension and a destination phone extension;

(b) means for receiving said communication by the communication manager of the host processor;

(c) means for processing said communication and determining an associated application program and an associated display terminal to link with said destination extension; and (d) means for invoking said associated application program to communicate with said associated display terminal to display information associated with said call transfer.

15. An apparatus for coordinating the transfer of a phone call and information associated with the phone call, as recited in claim 14, further comprising:

(a) means for searching said data structures in said host processor for a match of said source phone extension and a record of said data structure; and (b) means for retrieving an application name of said associated application program from said record of said data structure.

16. An apparatus for coordinating the transfer of a phone call and information associated with the phone call, as recited in claim 14, further comprising means for mapping a trunk to an application.

17. An apparatus for coordinating the transfer of a phone call and information associated with the phone call, as recited in claim 14 further comprising means for mapping a phone from the plurality of phones to an application program.

18. An apparatus for coordinating the transfer of a phone call and information associated with the phone call, as recited in claim 14, further comprising:
 (a) means for searching said data structures in said host processor for a match of said destination phone extension and a record of said data structure; and
 (b) means for retrieving an address of said associated display terminal from said record of said data structure.

19. An apparatus for coordinating the transfer of a phone call and information associated with the phone call, as recited in claim 14, further comprising means for updating the data structures with information associated with said transfer.

20. An apparatus for coordinating the transfer of a phone call and information associated with the phone call, as recited in claim 14, further comprising means for executing an application program to initialize the data structures in the host processor.

21. An apparatus for coordinating the transfer of a phone call and information associated with the phone call, as recited in claim 14, further comprising means for dynamically varying the data structures.

22. An apparatus for coordinating the transfer of a phone call and information associated with the phone call, as recited in claim 14, further comprising means for displaying information on said display terminal before the phone call is transferred.

23. An apparatus for coordinating the transfer of a phone call and information associated with the phone call, as recited in claim 14, further comprising:
 (a) means for accessing the data structures in the host processor by an application program;
 (b) retrieving information from said data structures; and
 (c) performing additional processing based on said information.

24. An apparatus for coordinating the transfer of a phone call and information associated with the phone call, as recited in claim 14, further comprising means for formatting said communication in accordance with a logical unit six dot (LU 6.2) transaction.

25. An apparatus for coordinating the transfer of a phone call and information associated with the phone call, as recited in claim 14, further comprising means for coordinating a conference call.

26. An apparatus for coordinating the transfer of a phone call and information associated with the phone call, as recited in claim 14, further comprising means for transferring the phone call and the information through one or more of the digital switches.

* * * * *